US012608343B2

(12) United States Patent
Cho et al.

(10) Patent No.: US 12,608,343 B2
(45) Date of Patent: Apr. 21, 2026

(54) DEVICE AND METHOD FOR COLLECTING, ANALYZING AND INTEGRATING LOG DATA OF IN-VEHICLE INFOTAINMENT SYSTEMS

(71) Applicant: Industry-Academic Cooperation Foundation, Dankook University, Yongin-si (KR)

(72) Inventors: Seong Je Cho, Yongin-si (KR); Hae In Kang, Yongin-si (KR); Jee Heun Jung, Seoul (KR); Hojun Seong, Hwaseong-si (KR); Ye Jin Yoon, Yongin-si (KR); Sun Jae Kim, Yongin-si (KR)

(73) Assignee: Industry-Academic Cooperation Foundation, Dankook University, Yongin-si (KR)

( * ) Notice: Subject to any disclaimer, the term of this patent is extended or adjusted under 35 U.S.C. 154(b) by 0 days.

(21) Appl. No.: 18/948,579

(22) Filed: Nov. 15, 2024

(65) Prior Publication Data

US 2025/0165436 A1 May 22, 2025

(30) Foreign Application Priority Data

Nov. 16, 2023 (KR) ........................ 10-2023-0158850
Nov. 16, 2023 (KR) ........................ 10-2023-0158856
(Continued)

(51) Int. Cl.
*G06F 17/00* (2019.01)
*G06F 16/17* (2019.01)
*G06F 16/25* (2019.01)
(52) U.S. Cl.
CPC ........ *G06F 16/1734* (2019.01); *G06F 16/254* (2019.01)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS 9,008,917 B2 4/2015 Gautama et al.
10,817,315 B1 * 10/2020 Chanda .................. B60K 35/50
(Continued)

FOREIGN PATENT DOCUMENTS

KR 10-2358833 B1 12/2020
KR 10-2021-0117934 A 9/2021

OTHER PUBLICATIONS

Kang Hae-in et al., Using Logs of an Android-based Audio Video Navigation System for a Timeline Analysis in Vehicle Digital Forensics, Published in 2023.
(Continued)

*Primary Examiner* — Hung D Le
(74) *Attorney, Agent, or Firm* — ZION IP; Byungwoong Park

(57) ABSTRACT

A device and a method for collecting, analyzing and integrating log data of an in-vehicle infotainment (IVI) system are disclosed. The method for collecting, analyzing and integrating log data of an IVI system includes identifying model information of a vehicle to be a target of digital forensics, hardware information and software information related to the IVI system of the vehicle, collecting target data for the digital forensics based on the model information, the hardware information and the software information, and storing the collected target data in an integrated database.

15 Claims, 24 Drawing Sheets

(30)        Foreign Application Priority Data

May 2, 2024   (KR) ......................... 10-2024-0058564
May 2, 2024   (KR) ......................... 10-2024-0058615

(58)  Field of Classification Search
CPC ....... G05B 13/00; H03M 7/30; H04N 9/8042;
G06T 9/00
See application file for complete search history.

(56)            References Cited

U.S. PATENT DOCUMENTS

| | | | |
|---|---|---|---|
| 11,724,690 B2 | 8/2023 | Kavadia et al. | |
| 2021/0012594 A1 | 1/2021 | Canpolat et al. | |
| 2022/0179644 A1* | 6/2022 | Harata | B60R 16/02 |
| 2022/0193337 A1* | 6/2022 | Alles | G16H 20/17 |
| 2022/0407872 A1 | 12/2022 | Min et al. | |

OTHER PUBLICATIONS

Jiheon Jung et al., Automotive digital forensics through data and log analysis of vehicle diagnosis Android apps, Published in 2024.
Haein Kang et al., Android-Based Audio Video Navigation System Forensics: a Case Study, Published May 18, 2023.
Yejin Yoon et al., Forensic Investigation of an Android Jellybean-based Car Audio Video Navigation System, Published Jun. 3-5, 2018.
Haein Kang et al., A Filtering Tool for Efficiently Analyzing Log Data of Android based in Vehicle Infotainment Systems, Published in 2023.

* cited by examiner

| Category | Data useful for forensics | | Ring buffer | Log file |
|---|---|---|---|---|
| Vehicle & IVI information data | Vehicle | VIN | tms | telematics_log.txt, mofgen2.log |
| | | NADiD | tms, radio | telematics_log.txt, mofgen2.log, wmmdll.log |
| | | ICCID | tms, radio | telematics_log.txt, mofgen2.log |
| | IVI | Build number | tms | telematics_log.txt |
| | | Software version | | |
| | | OS version | | |
| | | Kernel version | | |

FIG. 3A

| Category | Data useful for forensics | | | Ring buffer | Log file |
|---|---|---|---|---|---|
| Installed application data | DMB | Play | | main, system, tms | telematics_log.txt |
| | | Channel | | | |
| | Radio | Play | | | |
| | | Frequency | | | |
| Navigation data | GPS | Initial GPs | | tms | telematics_log.txt |
| | | Set Destination | | | |
| | | Last GPS | | | |

FIG. 3B

| Category | Data useful for forensics | | Ring buffer | Log file |
|---|---|---|---|---|
| Vehicle event data | Cluster | Run Distance | tms | telematics_log.txt |
| | | Total Fuel Consumption | | |
| | | Odometer Readings | | |
| | | Tire Pressure | | |
| | Events | Engine ON/OFF | main, system, tms | telematics_log.txt |
| | | Gear Indications | | |
| | | Seat Belt | | |
| | | Start/Stop a Car | | |
| | | Door Open/Close | | |
| | | Trunk Open/Close | | |

FIG. 3C

| Category | | Data useful for forensics | | Ring buffer | Log file |
|---|---|---|---|---|---|
| Data of device connected with Bluetooth | Connection | Connection Device Name | | main | none |
| | | Connection Device Bluetooth MAC address | | | |
| | Call | Outgoing/Incoming Call | | main, system | none |
| | | | Caller Name | | |
| | | | Caller Number | | |
| | | | Call Time | | |
| | | | Active or Inactive | | |
| | Message | Sender Name | | main, system | none |
| | | Sender Number | | | |
| | | Message Body | | | |
| | Music | Play and Pause | | main, system | none |
| | | Title and Artist | | | |

FIG. 3D

| | Bluetooth Data | Navigation Data | System Logs |
|---|---|---|---|
| Common artefacts | - MAC address of mobile device<br>- Mobile device name<br>- Phonebook<br>- Recent call history | - Recent destinations<br>- Search history for recent destinations<br>- Search history for destinations<br>- Favourite and registered locations on the navigation<br>- GPS tracklogs (longitude, latitude, etc.) | - Bluetooth connection time<br>- GPS tracklogs (longitude, latitude)<br>- Time stamp of the tracklogs |
| Different artefacts | - Storage paths for databases and files<br>- File names | - Names of database tables<br>- (Jellybean-based) Engine start time<br>- (KitKat-based) Driver profile | - (Jellybean-based) Mobile phone text messaging log in plain text<br>- (KitKat-based) Event log, Encrypted communication data |

FIG. 3E

| Event | Artifact | App Data | | Bluetooth HCI Log | | Android Log |
|---|---|---|---|---|---|---|
| | | TP² | I³ | TP | I | Main buffer |
| Bluetooth connection / disconnection | MAC address | o | o | o | o | o |
| | Time | o | o | o | o | o |
| | Scanner Name | o | o | o | o | x |
| Driving (Start, Sharp speeding, Sudden breaking, Idling) | Vehicle speed | o | o | o | o | x |
| | Intake manifold absolute pressure | o | o | o | o | x |
| | Engine position | o | o | o | o | x |
| | Throttle position | o | o | o | o | x |
| | Accelerator Pedal Position D | o | o | o | o | x |
| | Engine coolant temperature | o | o | x | o | x |
| | Calculated engine load | o | o | x | o | x |
| | Time | o | o | o | o | x |
| Vehicle Diagnosis | Packet pattern | x | o | o | o | x |
| | Time | x | o | o | o | x |
| Refueling | Fuel Tank Level | x | o | o | o | x |
| | Time | x | o | o | o | x |
| User information | User name, E-mail, Vehicle information | x | o | x | x | x |

¹ TP: Torque Pro.
² I: Infocar.

FIG. 3F

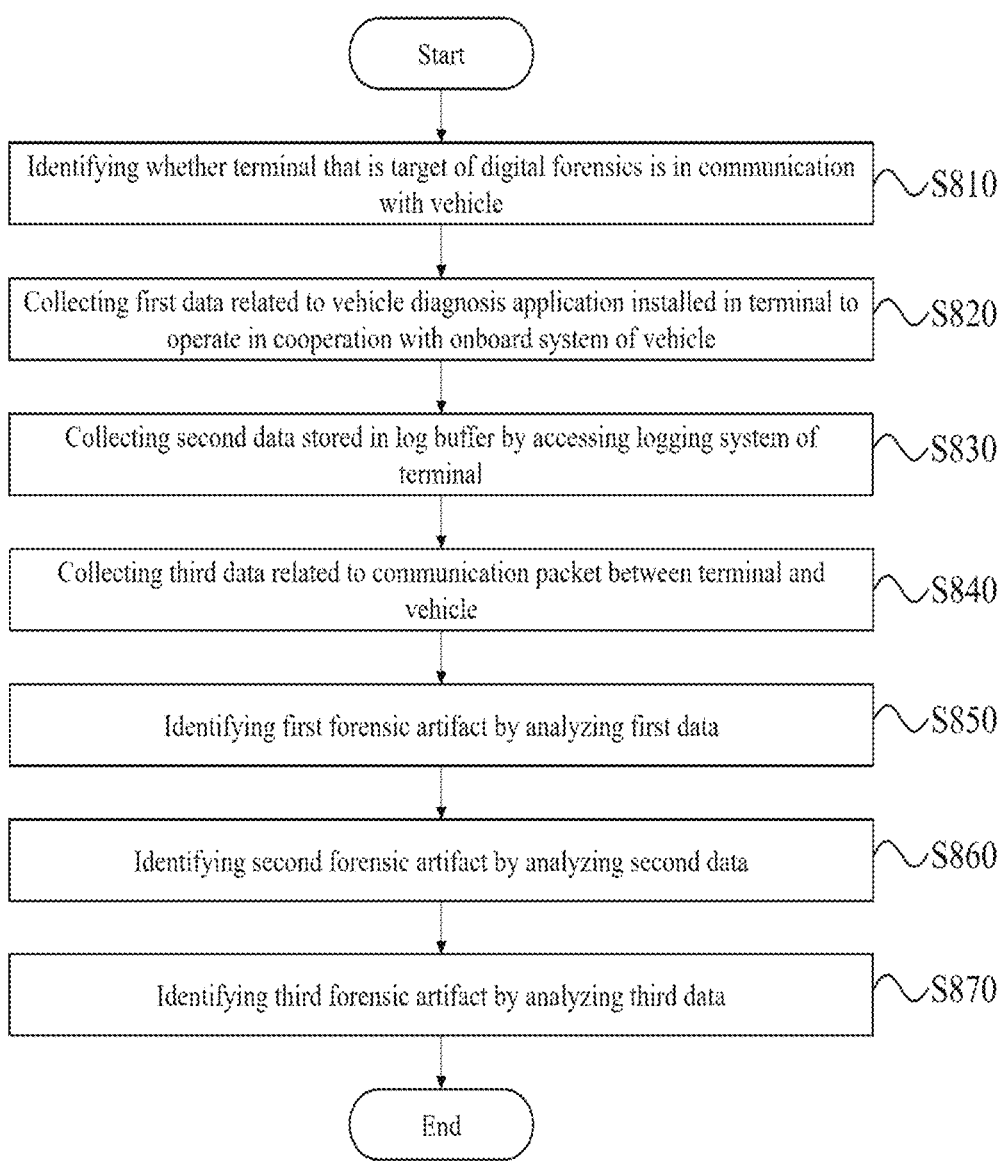

Start

Identifying whether terminal that is target of digital forensics is in communication with vehicle — S810

Collecting first data related to vehicle diagnosis application installed in terminal to operate in cooperation with onboard system of vehicle — S820

Collecting second data stored in log buffer by accessing logging system of terminal — S830

Collecting third data related to communication packet between terminal and vehicle — S840

Identifying first forensic artifact by analyzing first data — S850

Identifying second forensic artifact by analyzing second data — S860

Identifying third forensic artifact by analyzing third data — S870

End

FIG. 15

Start

Entering sysdump menu through dial input to terminal ⌇S1110

Storing third data in internal storage of terminal by executing logcat function after entering sysdump menu ⌇S1120

Storing third data stored in internal storage of terminal in storage medium inserted into electronic device ⌇S1130

End

DEVICE AND METHOD FOR COLLECTING, ANALYZING AND INTEGRATING LOG DATA OF IN-VEHICLE INFOTAINMENT SYSTEMS

CROSS-REFERENCE TO RELATED APPLICATIONS

This application claims priority under 35 U.S.C. § 119 to Korean Patent Application Nos. 10-2023-0158850 and 10-2023-0158856 filed on Nov. 16, 2023, and Korean Patent Application Nos. 10-2024-0058615 and 10-2024-0058564 filed on May 2, 2024 in the Korean Intellectual Property Office, the disclosures of which are incorporated by reference herein in their entireties.

STATEMENT REGARDING GOVERNMENT SPONSORED RESEARCH OR DEVELOPMENT

This present disclosure is derived from research conducted as part of the project of An effective/intelligent framework for vehicle forensics based on mobile platforms (Project Unique Number: 1711187188, Project Serial Number: 2021R1A2C2012574, Specialized Institution for Project Management: National Research Foundation of Korea, Research Project Name: Individual Basic Research (Ministry of Science and Technology), Name of the organization performing the task: Dankook University, Research Period: Mar. 1, 2023 to Feb. 29, 2024), supported by the Ministry of Science and ICT of the Republic of Korea.

Also, This present disclosure is derived from research conducted as part of the project of Development of collection and integrated analysis methods of automotive inter/intra system artifacts through construction of event-based experimental system (Project Unique Number: 1711193579, Project Serial Number: 2022-0-01022-002, Specialized Institution for Project Management: Information and Communications Technology Planning and Evaluation Institute, Research Project Name: Information Protection Core Source Technology Development (R&D), Name of the organization performing the task: Dankook University, Research Period: Jan. 1, 2023 to Dec. 31, 2023), supported by the Ministry of Science and ICT of the Republic of Korea.

Meanwhile, in all the aspects of the inventive concept, there is no property interest in the government of the Republic of Korea.

BACKGROUND

Embodiments of the present disclosure described herein relate to a method for collecting, analyzing and integrating data existing in an in-vehicle infotainment system and a computing device connected to the vehicle.

An investigative technique for finding clues at the crime scene by collecting and analyzing evidence left in digital media is called digital forensics. Digital forensics techniques are performed on various computing (electronic) devices such as computers, mobile terminals, embedded devices, and vehicles. In particular, as connectivity between in-vehicle digital devices and their interaction with external computing systems grows, the role of vehicle digital forensics becomes increasingly critical.

Android-based vehicle infotainment systems are widely used in modern vehicles. However, the structure and logging method of these systems often vary by vehicle model or manufacturer, and processes and tools for vehicle digital forensics lack standardization. This variability makes it challenging for current data collection and analysis technologies to accommodate the diversity of Android-based vehicle infotainment systems effectively.

SUMMARY

Embodiments of the present disclosure provide a device and a method for effectively performing digital forensics on vehicles by comprehensively collecting, analyzing and integrating log data generated from various sources, including operating systems, system applications, and user-installed applications or the like.

The technical problems to be solved by the embodiments are not limited to the technical problems described above, and other technical problems may be inferred from the following embodiments.

According to an aspect of the present disclosure, a method for collecting, analyzing and integrating log data of an in-vehicle infotainment (IVI) systems, the method being performed by an electronic device, includes identifying model information of a vehicle to be a target of digital forensics, hardware information and software information related to the IVI system of the vehicle, collecting target data for the digital forensics based on the model information, the hardware information and the software information, and storing the collected target data in an integrated database.

In an embodiment, the IVI system may be an IVI system based on the Android Jellybean operating system, an IVI system based on the KitKat operating system, or an IVI system based on another operating system version.

In an embodiment, the hardware information may include location information of a USB (Universal Serial Bus) port interface of the IVI system.

In an embodiment, the software information may include at least a portion of the version information of an operating system on which the IVI system operates, software version information of the IVI system, kernel version information of the IVI system, and a build number of the IVI system.

In an embodiment, collecting the target data may include operating the IVI system in Engineering mode or Dealer mode, depending on the model, hardware, and software information. Data is collected based on a type of menu available within the IVI system for each specific configuration.

As an related example, the collecting of the target data may include entering an Android Debug Bridge Connect Type (ADB Connect Type) menu and switching the IVI system to a debugging mode when the Android Debug Bridge Connect Type menu is provided in the IVI system, and collecting the target data based on data stored in a ring buffer of the IVI system or collecting data stored in storage by launching a shell and rooting an Android device, under the debugging mode. Specifically, the collecting of the target data may include executing the logcat command through the adb shell supported through the Android Debug Bridge connect type menu to transmit a copy of a log message (volatile data) stored in the ring buffer to a server connected to the vehicle as the target data. For example, in the case of Jellybean-based IVI systems, the log message stored in the ring buffer may include a log message stored in at least some of the main ring buffer, a system ring buffer, a radio ring buffer, an event ring buffer, a telematics (tms) ring buffer, an audio-video navigation (avn) ring buffer, and a vehicle customer relationship management (vcrm) ring buffer. In the case of the KitKat-based IVI systems, the log messages stored in the ring buffer may include log messages stored in at least some of the main ring buffer, the system ring buffer, the radio ring buffer, the event ring buffer, and the mobis ring buffer.

In addition, the electronic device 110 may collect non-volatile logs by using the 'Log Copy to USB' button in the 'System' and 'NAVI' sub-menus of the 'Log' menu in the Jellybean-based IVI systems. In addition, for example, in the KitKat-based IVI systems, when the 'ADB Connect Type' menu is not provided in the 'Engineering Mode' or the 'Dealer Mode,' the 'Copy Logs to USB' button is provided in the 'Copy to USB' menu, which is a submenu of the 'USB Copy' menu, so that the electronic device 110 may collect nonvolatile log data through the button.

In another related example, the collecting of the target data may include entering the Log Dump menu (e.g., "Log"—"Log Copy to USB" in the Jellybean-based IVI systems, "USB Copy"—"Copy Logs to USB" in the KitKat-based IVI systems) when the IVI system provides the Log Dump menu, and collecting the target data based on data stored in a storage device (e.g., a disk or SSD) of the IVI system. Specifically, collecting the target data may include transmitting a copy of a log file stored in the storage to a USB drive connected to the vehicle as the target data through the log dump menu. For example, the log file stored in the disk may include at least some of a telematics-related log file, an audio-video navigation-related log file, a vehicle customer relationship management-related log file, a file system (kernel) information-related log file, a mozen service-related log file, a network connect-related log file, and a Bluetooth service-related log file.

In the collection step, the Android device may be rooted by executing a shell command supported through the Android Debug Bridge connect type menu, and after rooting, a portion or all the data stored in the storage of the rooted Android devices may be collected through the dd command.

Meanwhile, the method for collecting, analyzing, and integrating log data of the IVI system may further include extracting and analyzing data that satisfies a filter condition set by a user input from data stored in the integrated database, and reconstructing the extracted data in a timeline format.

In an embodiment, the collecting of the target data may include collecting the target data from the vehicle based on data stored in a ring buffer or storages of the IVI system, and collecting the target data from a terminal connected to the vehicle based on data stored in the terminal.

In this case, the data stored in the terminal may include at least a portion of app data, log messages in the ring buffers, log files, and packet data generated and stored in the terminal, while the terminal is being connected to the vehicle.

Further, the storing of the collected data may include storing the target data collected from the vehicle into a first table within the integrated database, and storing the target data collected from the terminal in a second table within the integrated database.

According to an aspect of the present disclosure, an electronic device for collecting, analyzing and integrating log data of an in-vehicle infotainment (IVI) system includes a transceiver, a memory that stores instructions, and a processor, and the processor may, while being connected to the memory, identify model information of a vehicle to be a subject of digital forensics, hardware information and software information related to the IVI system of the vehicle, collect target data for the digital forensics based on the model information, the hardware information and the software information, and store the collected target data in an integrated database.

According to an aspect of the present disclosure, a computer-readable recording medium having recorded thereon a program for implementing a method performed by an electronic device may be provided.

According to an aspect of the present disclosure, a method for collecting and analyzing data related to vehicle diagnosis performed by an electronic device includes identifying whether a mobile device (terminal), a target of digital forensics, is in communication with the vehicle, and collecting and analyzing three types of forensic data or artifacts: Type 1 forensic data or artifacts, Type 2 forensic data or artifacts, and Type 3 forensic data or artifacts. Specifically, the method consists of collecting Type 1 data related to the vehicle diagnosis application installed in the mobile device to operate in cooperation with an onboard system of the vehicle; analyzing the Type 1 data (e.g., vehicle diagnosis app data) using a forensic tool such as autopsy to identify the Type 1 forensic artifacts, accessing the logging system of the mobile device to collect Type 2 data stored in memory ring buffers, analyzing the Type 2 data (e.g., ring buffer data) using a tool such as notepad to identify the Type 2 forensic artifacts, collecting Type 3 data (e.g., Bluetooth packet data) related to a communication packet between the mobile device and the vehicle, and analyzing the Type 3 data using a network packet tool to identify the Type 3 forensic artifacts.

In an embodiment, the collecting of the Type 1 data (the first data) may include executing a shell command of an Android Debug Bridge tool through a USB (Universal Serial Bus) connection between the mobile device and the electronic device, changing to a root user through the su command while the shell command is being executed, identifying the information about a specific mount point of a disk partition where the Type 1 data is stored through the Linux mount command, and storing the Type 1 data in the partition into a storage medium of the electronic device through the mount point information and dd command.

In an embodiment, the collecting of the Type 2 data (the second data) may include executing the shell command of an Android Debug Bridge tool through the USB connection between the mobile device and the electronic device, and storing the Type 2 data in the "ring buffers" as a text file into a storage medium of the electronic device by executing the logcat command, while the shell command is being executed.

In an embodiment, the collecting of the Type 3 data (the third data) may include accessing the "SysDump" feature by entering a sequence of keypads (e.g., '* #9900 #') from the Dialing screen on the Android phone, tapping 'Run dumpstate/logcat' menu to store the Type 3 data into the internal storage of the Android phone, and storing the Type 3 data in the internal storage into a storage medium connected of the electronic device.

According to an embodiment, the Type 1 forensic artifacts may include event information for at least some of the total distance the vehicle has traveled, average fuel efficiency, driving start time, driving end time, driving time, latitude of the driving start point, longitude of the driving start point, latitude of the driving end point, longitude of the driving end point, real-time latitude, real-time longitude, user information registered in the vehicle diagnosis application, diagnosis start time, fault code, diagnosis code, timestamps of sudden acceleration/deceleration, sudden acceleration time, sudden acceleration count, sudden deceleration time, and sudden deceleration count.

According to an embodiment, the Type 2 forensic artifacts may include at least some of the MAC address of the OBD-II scanner, a log message according to the communication connection between the mobile device and the vehicle, and a log message according to the communication disconnection between the mobile device and the vehicle.

According to an embodiment, the Type 3 forensic artifacts may include event information about at least some of the communication connection between the mobile device and the vehicle, the communication disconnection, the driving start time, sudden acceleration, sudden deceleration, idling of the vehicle, vehicle diagnosis, and vehicle refueling.

Meanwhile, the method for collecting and analyzing the vehicle diagnosis-related data may further include storing the Type 1 forensic artifacts, the Type 2 forensic artifacts, and the Type 3 forensic artifacts into an integrated database.

Further, the method for collecting and analyzing the vehicle diagnosis-related data may further include extracting the data that satisfies a filter condition set by a user input from the data stored in the integrated database and reconstructing the extracted and analyzed data in a timeline format.

According to an aspect of the present disclosure, an electronic device for collecting and analyzing vehicle diagnosis-related data includes a transceiver, a memory that stores instructions, and a processor, wherein the processor is connected to the transceiver and the memory to identify whether a mobile device, a target of digital forensics, is in communication with a vehicle, collect the Type 1 data related to a vehicle diagnostic application installed in the mobile device to operate with cooperation with an onboard system of the vehicle, analyze the Type 1 data using a forensic tool to identify the Type 1 forensic artifacts, access a logging system of the mobile device to collect the Type 2 data stored in the memory ring buffers, analyze the Type 2 data using a tool such as notepad to identify the Type 2 forensic artifacts, collect the Type 3 data related to a communication packet between the mobile device and the vehicle, and analyze the Type 3 data using a network packet tool to identify the Type 3 forensic artifacts.

Meanwhile, according to an aspect of the present disclosure, a computer-readable recording medium having recorded thereon a program for implementing a method performed by an electronic device may be provided.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 3A, 3B, 3C, 3D, 3E and 3F show examples of log data that are the target of collection and integration;

FIG. 15 is a flowchart of a method of collecting and analyzing vehicle diagnostics-related data of an electronic device according to an embodiment;

DETAILED DESCRIPTION

Figure 1:
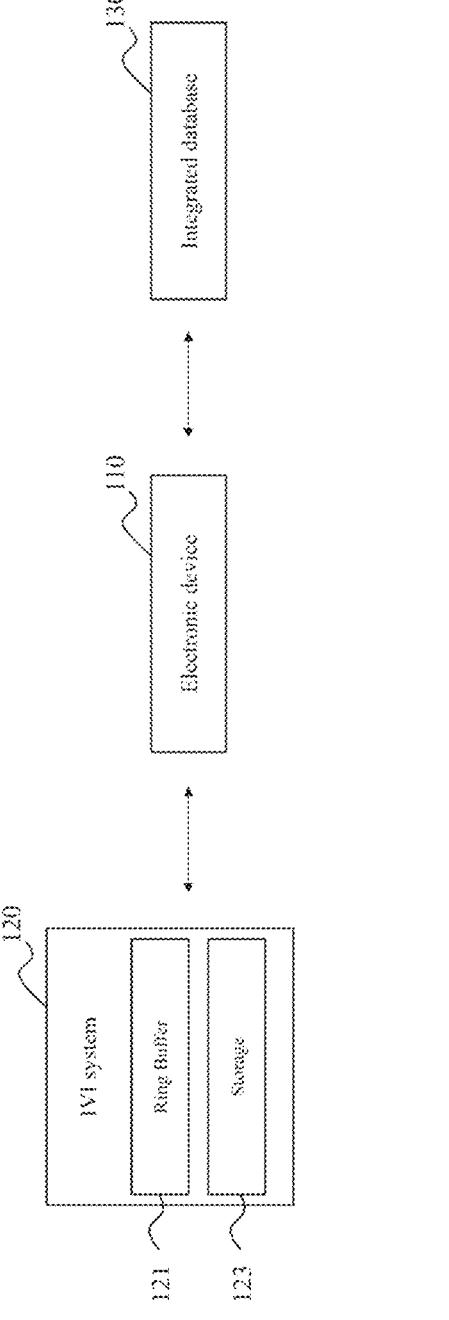
FIG. 1 is a schematic illustration of a system for collecting, analyzing and integrating log data, including an electronic device according to an embodiment.

Hereinafter, exemplary embodiments of the present disclosure will be described in detail with reference to the drawings. The following detailed description is provided to help comprehensive understanding of a method, an apparatus, and/or a system disclosed herein. However, this is merely exemplary, and the present disclosure is not limited thereto.

While describing the present disclosure, when it is determined that a detailed description of a known art related to the present disclosure may unnecessarily obscure the gist of the present disclosure, the detailed description will be omitted. Terms which will be used below are defined in consideration of functionality in the present disclosure, which may vary according to an intention of a user or an operator or a usual practice. Therefore, definitions thereof should be made on the basis of the overall contents of this specification. Terminology used herein is for the purpose of describing exemplary embodiments of the present disclosure only and is not intended to be limiting. The singular forms are intended to include the plural forms as well, unless the context clearly indicates otherwise. It should be understood that the terms "comprises," "comprising," "includes," and "including," when used herein, specify the presence of stated features, numerals, steps, operations, elements, or combinations thereof, but do not preclude the presence or addition of one or more other features, numerals, steps, operations, elements, or combinations thereof.

Terms used in embodiments are common terms currently and widely used by taking into consideration functions in the present disclosure, but the terms may be changed depending on an intention of a technician skilled in the art, a precedent, or the advent of a new technology. Furthermore, in a specific case, some terms are randomly selected by the applicant. In this case, the meaning of a corresponding term will be described in detail in the corresponding description of the disclosure. Accordingly, terms used in the present disclosure should be defined based on their substantial meanings and contents over the present disclosure, not the simple names of the terms.

In addition, throughout the specification, unless explicitly described to the contrary, the word "comprise" and variations such as "comprises" or "comprising" will be understood to imply the inclusion of stated elements but not the exclusion of any other elements. In addition, terms such as " . . . unit" and " . . . module" refer to units that perform at least one function or operation, and the units may be implemented as hardware or software or as a combination of hardware and software.

The expression "at least one of a, b, and c" as stated throughout the specification can encompass 'a alone,' 'b alone,' 'c alone,' 'a and b,' 'a and c,' 'b and c,' or 'all of a, b, and c.'

Here, the terminal described below may be implemented as a computer capable of accessing a server or a terminal at a remote location through a network. Here, the computer may include, for example, a notebook, desktop, or laptop equipped with a WEB browser, and the portable terminal may include, for example, a wireless communication device that ensures portability and mobility, such as a communication-based terminal such as IMT (International Mobile Telecommunication), CDMA (Code Division Multiple Access), W-CDMA (W-Code Division Multiple Access), LTE (Long Term Evolution), and all kinds of handheld-based wireless communication devices such as a smartphone, tablet PC, etc.

In the following description, the terminology of "communication", "transmission", "reception" of a signal or information and terminology similar thereto may include a meaning in which a signal or information is directly transmitted from one element to another element and is transmitted from one element to another element through an intervening element. Particularly, a meaning in which a signal or information is "transmitted" or "sent" to another element may indicate a final destination of the signal or information and may not mean a direct destination. This may be equally applied with respect to a meaning of "reception" of the signal or information. Further, in this specification, a meaning in which two or more pieces of data or information are related, it may mean that at least a portion of another data (or information) may be obtained based on one data when one data (or information) is obtained.

Further, it will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

In describing the embodiments, descriptions of technical contents that are well known in the technical field to which the present invention pertains and are not directly related to the present invention will be omitted. This is to more clearly convey the gist of the present invention by omitting unnecessary description. For the same reason, in the accompanying drawings, some elements are enlarged, omitted, or depicted schematically. Furthermore, the size of each element does not accurately reflect its real size. In the drawings, the same or similar elements are assigned the same reference numerals.

Advantages and features of the present disclosure and methods for achieving them will be apparent with reference to embodiments described below in detail in conjunction with the accompanying drawings. However, the present disclosure is not limited to the embodiments disclosed below, but can be implemented in various forms, and these embodiments are to make the disclosure of the present disclosure complete, and are provided so that this disclosure will be thorough and complete and will fully convey the scope of the invention to those of ordinary skill in the art, which is to be defined only by the scope of the claims. Like reference numerals refer to like elements throughout the specification.

In the present disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded into a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

Hereinafter, with reference to the accompanying drawings, embodiments of the present disclosure will be described in detail such that those of ordinary skill in the art can easily carry out the present disclosure. However, the present disclosure may be embodied in many different forms and should not be construed as limited to the embodiments set forth herein. The methods illustrated in FIGS. 4 through 7 may be performed, for example, by an electronic device 110 described with reference to FIG. 10. Additionally, the methods illustrated in FIGS. 11 through 17 may be performed by an electronic device 1110, described, for example, with reference to FIG. 17. The electronic device 110 or 1110 is an exemplary device for collecting, analyzing and integrating log data in the present disclosure, and may be a single device, but may also be a device comprising a plurality of detailed devices communicating with each other over a network, either wired or wireless, according to embodiments.

FIG. 1 is a schematic illustration of a system for collecting, analyzing and integrating log data, including an electronic device according to an embodiment.

Referring to FIG. 1, a system for collecting, analyzing and integrating log data may include the electronic device 110, an In-Vehicle Infotainment (IVI) system 120, and an integrated database 130. The electronic device may also be referred to as a computing device.

The electronic device 110 may request information required for data collection from the IVI system 120, or may obtain access permission to identify and acquire relevant information from the IVI system 120. The electronic device 110 may also identify at least a portion of data stored on a storage medium (storage space) of the IVI system 120 and collect the original or a copy of the identified data as target data (original data) for digital forensics. In addition, the electronic device 110 may transmit the collected target data to the integrated database 130, and may request the integrated database 130 to store the transmitted target data.

During the data collection phase, to ensure compliance with the Chain of Custody, the entire data collection process is recorded on video. Vehicle identification information (such as the VIN and model) and mobile device identification information (such as the IMEI number and UUID) are collected and managed together, allowing each data set to be clearly associated with its originating vehicle or device. Additionally, a cryptographic hash value is generated for each file extracted from the digital forensics target device, and each file is stored and managed with its corresponding hash value. When data is transferred or duplicated, documentation is created following the Six Ws Principles. In the analysis phase, an identical copy of the original data is created, and analysis is conducted on this duplicate.

The IVI system 120 may be a system that provides information and entertainment to a driver and passengers by integrating systems inside and outside the vehicle. The IVI system 120 may also be referred to as a Smart Infotainment System or In-Car Infotainment System, and may include devices or technologies that provide, within a vehicle, internet browsing, movies, games, television (TV), social networking services (SNS), as well as various services in cooperation with a navigation device or a mobile device. The IVI system may also be referred to as an Audio Video Navigation (AVN) System or Radio Navigation System (RNS).

The IVI system 120 may also include a logging system capable of storing log data and in this case, the log data may include log messages generated based on vehicle status or driver activity, or log messages generated as the vehicle interacts with other devices. The log messages may be stored in a ring buffer 121, or may be stored in storage 123 in the form of log files. As used herein, "ring buffer" refers to a volatile storage space, and log messages stored in the ring buffer may be lost when a device equipped with the IVI system 120 is powered off. Further, the ring buffer is designed to be relatively small in size compared to a disk, and is able to only store relatively recent log messages, compared to a disk. As used herein, "storage" refers to non-volatile storage space, and log messages stored in the storage may be preserved even when the device with the IVI system 120 is powered off. Log files may be generated as the log messages stored in the ring buffer are flushed to the storage and stored in the storage. Since the storage is relatively larger than the ring buffer and stores data in a compressed format, the storage may store relatively old log messages, compared to the ring buffer. In this case, the ring buffer may also be referred to as a circular buffer.

Meanwhile, the electronic device 110 may exchange information with the IVI system 120 and the integrated database 130 via a network electronically connected therebetween. The network may be a comprehensive data communication network that includes a local area network (LAN), a wide area network (WAN), a value added network (VAN), a mobile radio communication network, a satellite communication network, a content delivery network (CDN), and any combination thereof and enables smooth communication between network components depicted in FIG. 1, and may include wired internet, wireless internet, and mobile wireless communication networks. The wireless communication may be, for example, but not limited to, wireless LAN (Wi-Fi), Bluetooth, Bluetooth low energy, Zigbee, Wi-Fi Direct (WFD), ultra wideband (UWB), infrared data association (IrDA), near field communication (NFC), and the like.

The system illustrated in FIG. 1 shows only components relevant to the present embodiment. Accordingly, it will be understood by one of ordinary skill in the art that other general purpose components may be included in addition to those shown in FIG. 1.

Figure 2:
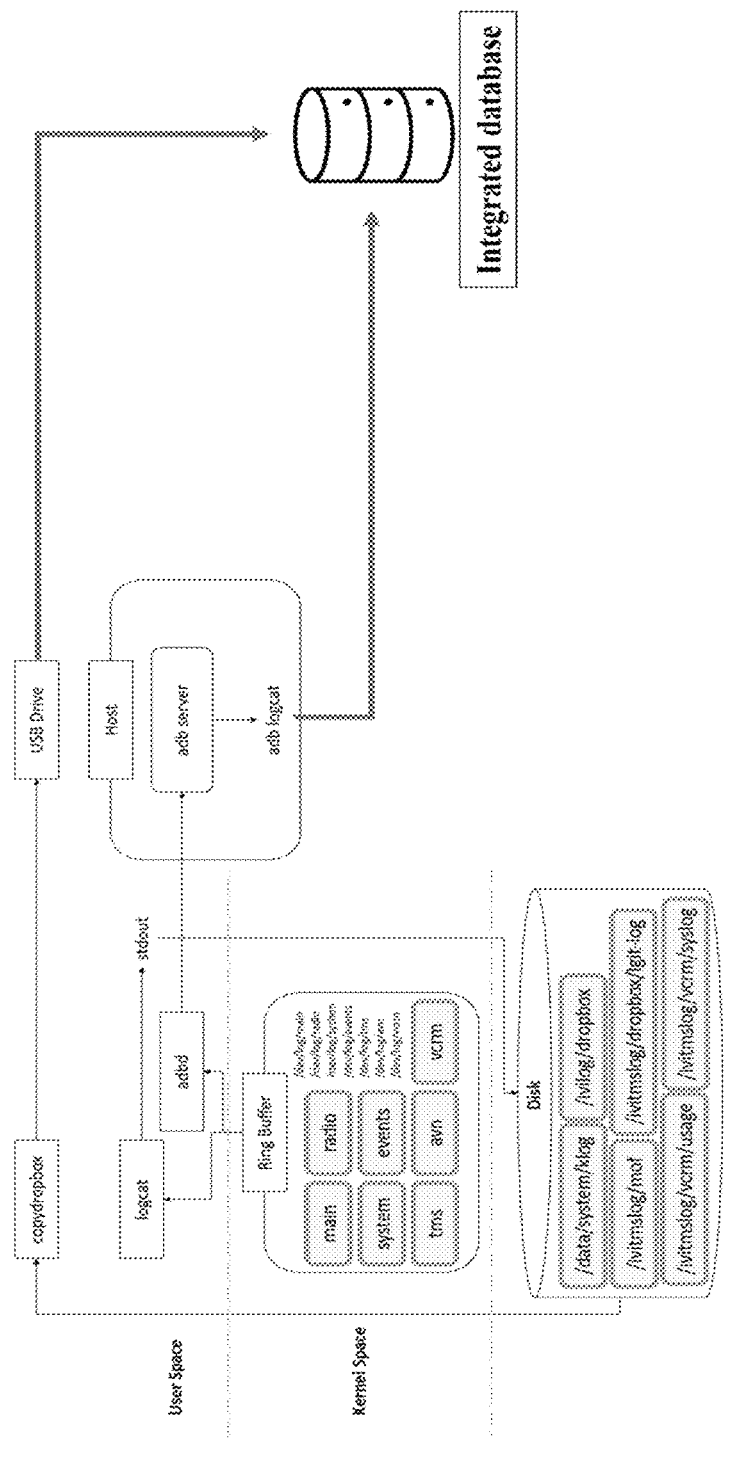
FIG. 2 is an illustrative diagram of data flow among an IVI logging system, an electronic device and an integrated database within an Android Jellybean-based IVI system.

FIG. 2 is an illustrative diagram of data flow among an IVI logging system, an electronic device and an integrated database within an IVI system. FIG. 2 illustrates the IVI logging system of the Jelly Bean version, while there may be differences in number and names of ring buffers, as well as number and paths of log files in the KitKat version or the latest version of the IVI logging system.

The IVI logging system may consist of a Kernel space where log messages are generated and a User space where log messages are able to be collected by accessing the Kernel space. The IVI logging system based on the Android Jelly Bean operating system may manage seven ring buffers: main, system, radio, events, tms, avn, and vcrm buffers. Four of these buffers (main, system, radio, and events) may be managed on the Android-based terminal, and the remaining three buffers (tms, avn, and vcrm) may be managed on the Android-based IVI device.

The seven log files may include non-volatile data that exists only on the Android-based IVI. For example, the seven log files may include navigation information, Bluetooth-related information, telematics events, device status information, and the like.

The main buffer may record events generated by the IVI's applications such as DMB, Bluetooth, navigation, and the like, and the system buffer may record low-level log messages or debugging messages generated by the system. In addition, the RADIO buffer may store log messages related to radio or phone, and the EVENTS buffer may store log messages for important system events.

The TMS buffer may store messages generated by the telematics unit. The telematics unit is a unit with various functions, such as GPS tracking, vehicle diagnostics, driving monitoring, communication functions, and integration with other systems, and therefore, the amount of log messages stored in the TMS buffer may be relatively large compared to the other buffers. The AVN buffer may store log messages related to the hands-free function, automatic sound adjustment function, and audio signal trouble diagnosis function of the IVI system 120. The VCRM buffer may store log messages related to the frequency of usage of the telematics unit. The VCRM buffer may also record user preferences, usage data, and other types of data. The KitKat-based IVI system 120 may include log messages in a mobis ring buffer where IVI and telematics-related information is stored.

The log messages, which are managed in the kernel space, may be accessed through the device node in the "/dev/log" directory and the log messages may be extracted in binary form. The log messages may be extracted in text format using Android's adb logcat. The extracted IVI log messages may include a log message stored on the Android-based terminal and at least a portion of timestamps, PID, TID, level, tag, and body fields.

The IVI system 120 may automatically compress log messages in the ring buffer and store them in a plurality of log files on a disk. Of these, some log files may be accessible by the user and the other some log files may be non-accessible by the user.

In a Jellybean-based IVI system, file the "/ivilog/dropbox/trace_log.txt" may store avn logs when the log level is set to 'A', and main, system, and store radio logs when the log level is set to 'V' (Verbose). Typically, for the IVI system 120, the log level is set to 'A' by default, so that, if the setting has not been changed, the avn logs may be extracted. When storing VCRM logs, the file "/ivitmslog/vcrm/usage/Standard_Log.data" may be generated. The Linux kernel version and the log level may be identified through the file "/data/system/klog/kernel_log.txt". Meanwhile, the file "/ivitmslog/mof/mofgen2. log" may contain logs related to the mozen service. "mozen" may provide quick route guidance reflecting traffic conditions and remote diagnosis of vehicle abnormalities for Hyundai and Kia vehicle users, and the VIN and NADID (Network Access Device ID) may be identified via this file. The file "/ivitmslog/dropbox/lgit-log/wmmdll.log" may contain logs related to network connectivity. Via this file, the Integrated Circuit Card Identifier (ICCID) number, which is a unique identifier for a SIM card may be identified. The file "/data/system/dump/dump@epochtime_dumpstate.txt" may record device status and system information. From those files, the default log level may be identified, and the seven ring buffers may be found by analyzing messages containing the string "/dev/log". The file "/ivitmslog/vcrm/syslog/telematics_log.txt" may record the log messages of the tms ring buffer.

Meanwhile, a disk log file may be extracted through a log dump. In an Engineering mode and a Dealer mode, which are hidden functions of the IVI system 120, a soft button capable of performing the log dump may be provided. In addition, in the Engineering mode and the Dealer mode, a log file stored in the storage may be copied to a USB storage device. When a log message stored in the log file is identical or similar to the log message stored in a ring buffer, the data may be analyzed based on the timestamp, tag, and body fields.

In order to examine the log data stored in the IVI system 120 illustrated in FIG. 2 in more detail, FIGS. 3A to 3F will be described below as examples. FIGS. 3A to 3F are examples of log data that are the target of collection and integration.

FIG. 3A is data for vehicle information and information about the IVI system 120 which are able to be stored in a ring buffer and a disk, and the category thereof may include various artifacts such as VIN, NADID, ICCID, IVI build number, IVI software version, IVI operating system (OS) version, and IVI kernel version. These may be found in both volatile and non-volatile logs. VIN may refer to a unique ID of a vehicle, which is made of 17 characters. NADID may refer to a mobile phone number of the telematics unit. ICCID may refer to a code that includes a country code, a SIM card issuer identifier, and a SIM number (or account ID). A forensic investigator may identify a vehicle owner from the aforementioned information.

FIG. 3B is application data and navigation data installed in the vehicle, which are able to be stored in the ring buffer and the storage, and the category thereof may include artifacts such as DMB Play and Radio Play. The installed application data may be found in both volatile and non-volatile logs. When DMB or Radio is being played, a log message with TDMBlayer tag or RadioAppManager tag may be generated in a main buffer. This log may identify a reception channel or frequency. The log message that records a channel change may be found in the TMS buffer and "telematics_log.txt".

On the other hand, the category of the navigation data may include artifacts such as initial GPS, Set Destination, Last GPS or the like. The navigation data may be found in both volatile and non-volatile logs. When an engine starts, a log message with GisService tag may be generated. This message may include longitude and latitude information, so that the vehicle's location may be tracked. When a moving destination is set, the destination's name, address, latitude, and longitude information may be recorded. When the engine stops, a log message with GeneralDrvInfoVcrmService tag may be generated, which may be used to find the vehicle's latitude and longitude.

FIG. 3C shows a vehicle event data that is able to be stored in a ring buffer and a disk, and the category thereof may include a number of artifacts. The mileage, total fuel consumption, odometer readings, and tire pressures are some of measurements displayed on the clusters on a dashboard. The odometer readings may be found in a log message generated when the engine is started or stopped. The tire pressures may be identified in a log message with DrivingInfoService tag generated when the engine is started. The air pressure of each tire may be retrieved from the log message. The mileage and total fuel consumption may be identified in a log message generated when the engine is stopped.

Another six artifacts (Engine On/Off, Gear indications, Seat Belt, "Start/Stop a car", Door Open/Close, Trunk Open/Close) may also be included in this category. The Engine ON/OFF may indicate whether the engine is started or not. The Gear Indications may indicate the gear indications (D, P, N, and R). The Seat Belt may indicate whether a driver or passenger seat belt is fastened. The "Start/Stop a car" may indicate whether the vehicle is started or stopped. The Door Open/Close may indicate whether the driver's door is open, the front passenger door is open, the rear left door is open, the rear right door is open, or the like. Also, the Trunk Open/Close may indicate whether the door is open or closed.

FIG. 3D is a Bluetooth-connected device data to the vehicle, which is able to be stored in the ring buffer, and the category thereof may include: the four artifacts of Connection, Call, Message, and Music may be recorded in the volatile log (main, system ring buffers) of the Jellybean-based IVI system or in the nonvolatile log ("/bluetoothLog/BT_Log_yyyymmdd.hhmmss/BluetoothLogFiles/bluetoothLogFilte r.log" file) of the KitKat-based IVI system. With respect to the connection artifacts, when the driver connects a smartphone to the IVI system 120 via Bluetooth, the driver is able to use a hands-free function, and in this case, the IVI system 120 may generate a log message including the Bluetooth connection setup time, the connected smartphone's name, the Bluetooth MAC address, and the like. Meanwhile, with respect to the call artifacts, when the driver sends or receives a call, the IVI system 120 may record information about call type (outgoing or incoming), caller name, caller number, call time, and active/inactive call. Further, with respect to the message artifacts, the IVI system 120 may record the sender name, sender number, and message body when an SMS is received. Meanwhile, with respect to the music artifacts, the IVI system 120 may record play/pause events, titles, and artists.

FIG. 3E is a comparative analysis of major artifacts between a Jelly Bean based AVN system and a KitKat based AVN system. Specifically, FIG. 3E is a diagram showing major artifacts obtained from Bluetooth data, navigation data, and system logs.

Referring to FIG. 3E, it can be seen that most of the Bluetooth data and navigation data are very similar in the Jelly Bean and KitKat based AVN systems, but there are slight differences in data storage locations, file names, and sub-fields. In the KitKat based AVN system, a function of setting up each driver's profile is added to a navigation module, and profile information stored for each driver may be analyzed.

In both versions of the AVN systems, the system log may include general artifacts such as Bluetooth connection time, GPS tracking log, and timestamp. However, the system log of the Jelly Bean-based AVN system records a message reception log of the connected smartphone in plain text, while the system log of the KitKat-based AVN system records the contents of the message reception log in encrypted form.

In addition, unlike the Jelly Bean-based AVN system, the KitKat-based AVN system may include additional logs related to vehicle events, capable of identifying vehicle door open/close information, gear shift status, and driving status.

FIG. 3F is a diagram showing artifacts collected from three types of data sources and analyzed. Referring to FIG. 3F, Infocar app data may contain the most artifacts among the three types of data. The Infocar app may store data using a SQLite database, while the Torque Pro app may store data in XML, CSV, and property files instead of a database. Since the Infocar scanner provides more diagnostic data than the Torque Pro scanner, there are more artifacts stored in the Bluetooth HCI snoop log when using the Infocar app.

For a Bluetooth connect/disconnect event, there may be three artifacts: connect/disconnect time, OBD-II Bluetooth scanner name, and the MAC address of the scanner. The app data of the Infocar and Torque Pro may include all three artifacts. The Bluetooth HCI snoop log may also include all three artifacts. The main ring buffer of Android may not include the scanner name.

The app data of Infocar and the Bluetooth HCI snoop log may include all driving-related artifacts. The app data of Torque Pro may also include all driving-related artifacts, but the Bluetooth snoop log may not include two artifacts: engine coolant temperature and calculated engine load. Further, the main buffer of Android may not include driving-related artifacts.

For a vehicle diagnostic event, the app data of Infocar and Bluetooth HCI snoop log may include information about when the diagnostic function was used, but the app data of Torque Pro and the main buffer of Android may not include the information.

For a fuel refueling event, the Infocar app data and Bluetooth HCI snoop log may include information about the fuel tank gauge and the time when the fuel refueling event occurred, but the Torque Pro app data and the Android main buffer may not include them. In particular, the Infocar app data may also include user information such as user name, email address, registered vehicle model and manufacturer when using the app.

Figure 4:
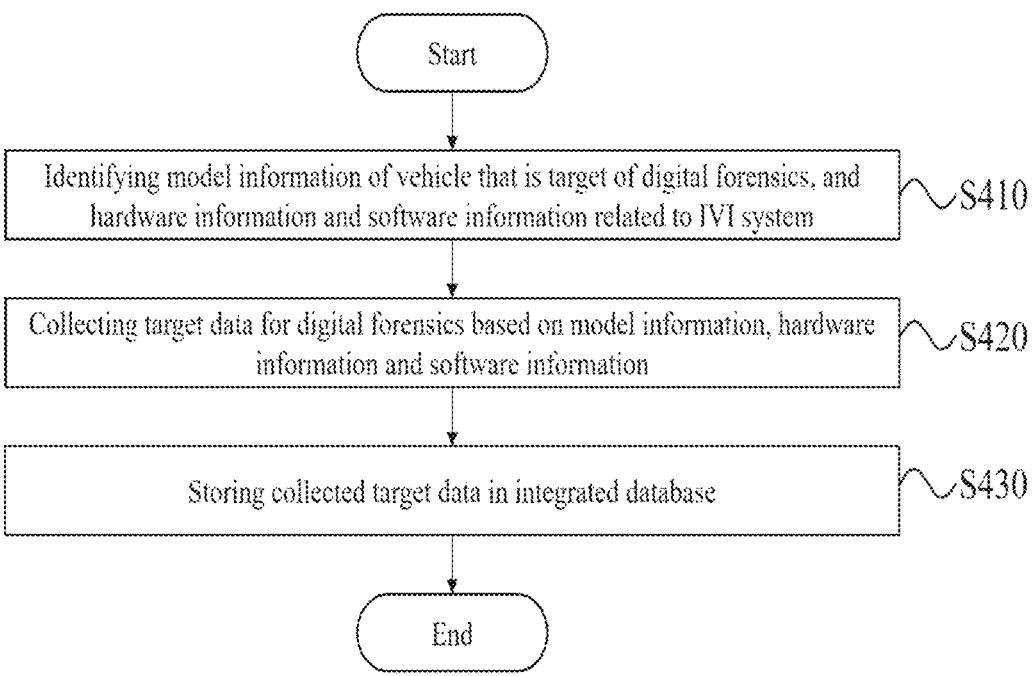
FIG. 4 is a flowchart of a method for collecting, analyzing and integrating log data of an electronic device according to an embodiment.

FIG. 4 is a flowchart of a method for collecting, analyzing and integrating log data of an electronic device according to an embodiment. For convenience of description, the electronic device 110 is described as an entity of performing the example method, but the entity of performing the method is not limited thereto.

Forensic data collection sources may include, for example, a vehicle's IVI system and a driver's smartphone connected to the vehicle. Specifically, data to be collected may include, for example, volatile logs (ring buffers) and nonvolatile logs (log files, app data) related to the IVI of the vehicle, and volatile logs (ring buffers) and nonvolatile data (mobile app data, Bluetooth HCI snoop log data) of a mobile terminal connected to the vehicle, such as a driver's smartphone. Data is individually collected from the IVI system or smartphone and stored in an individual DB first, and then these individual data are integrated and stored in an integrated DB.

In step S410, the electronic device 110 may identify model information of a vehicle that is the target of digital forensics, and hardware information, and software information related to the IVI system 120 of the vehicle.

The IVI system 120 may be an IVI system based on Android Gingerbread, Jellybean, or KitKat, or an automotive operating system or Connected Car Operating Systems (ccOS). The IVI system 120 may also be referred to as an Audio Video Navigation (AVN) System. Meanwhile, hardware information related to the IVI system 120 may include location information of a USB (Universal Serial Bus) port interface of the IVI system 120. In addition, software information related to the IVI system 120 may include at least some of the operating system version information on which the IVI system 120 operates, software version information of the IVI system 120, kernel version information of the IVI system 120, and the build number of the IVI system 120.

In step S420, the electronic device 110 may collect target data for digital forensics based on the identified model information, hardware information, and software information.

According to an embodiment, the electronic device 110 may drive the IVI system 120 in an Engineering mode or a Dealer mode based on the vehicle model information, hardware information and software information related to the IVI system 120, and collect target data that may be collected according to the type of menu provided by the IVI system 120. In this regard, details will be described later with reference to FIG. 5 below.

In step S430, the electronic device 110 may store the collected target data in the integrated database 130.

Figure 5:
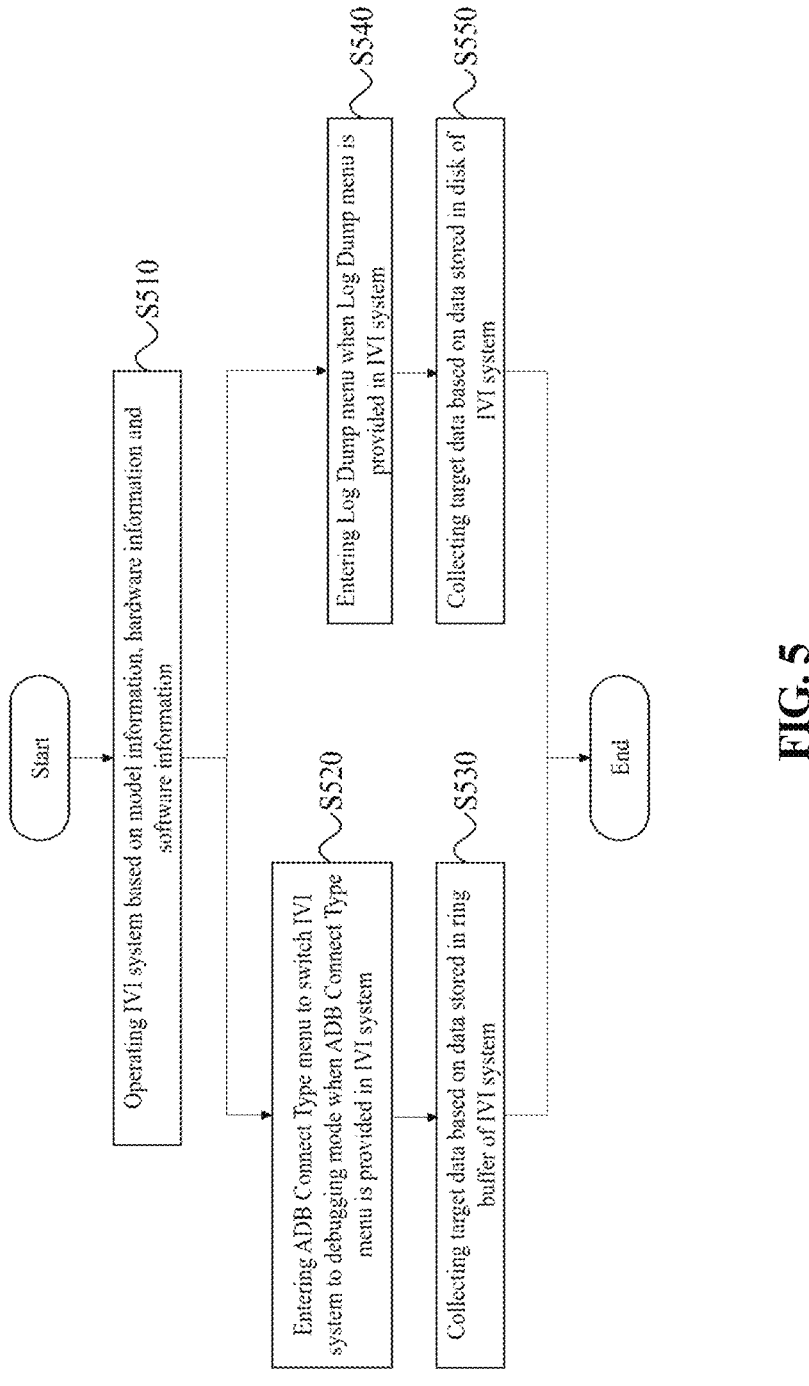
FIG. 5 is a flowchart of a specific embodiment of collecting target data from an IVI system.

FIG. 5 is a flowchart of a specific embodiment of collecting target data. For convenience of description, the electronic device 110 is described as an entity of performing the example method, but the entity of performing the method is not limited thereto.

The method of collecting data may include a logical acquisition method and a physical acquisition method. The logical acquisition method may include a method of collecting System logs or Navigation logs through the Engineering mode or the Dealer mode, and a method of finding an ADB Connect Type interface through the Engineering mode, launching an adb shell, rooting a device, and dumping the entire the contents of storage from the rooted device using the dd command. The physical acquisition method may include a method of extracting the contents of storage through the JTAG terminal, or a method of extracting the contents of storage through Chip-off.

FIG. 5 is a flowchart of an example of logical extraction that fetches the whole contents of the entire storage through the ADB connect type menu in the Engineering mode. However, the logical extraction is not limited thereto, and logical extraction that collects volatile logs (ring buffers) and non-volatile logs (System log and NAVI log) in the Engineering mode is also available.

In a certain vehicle, Dealer mode may need to be used instead of Engineering mode. At S540*d*, the term "Log Dump" specifically refers to a process of clicking the "Log Copy to USB" button in the "Log" menu on a Jellybean-based IVI system, and the "Copy Logs to USB" button in the "USB Copy" menu—"Copy to USB" submenu on a KitKat-based IVI system.

In step S510, the electronic device 110 may drive the IVI system 120 in the Engineering mode based on the identified model information, hardware information, and software information. In this case, the electronic device 110 may use the Engineering mode to drive the IVI system 120. However, the electronic device 110 may also perform physical extraction to fetch the contents of the entire storage through Chip-off instead of the Engineering mode.

In step S520, when the Android Debug Bridge Connect Type (ADB Connect Type) menu is provided in the IVI system 120, the electronic device 110 may enter the Android Debug Bridge Connect Type menu and switch the IVI system 120 to a debugging mode.

In step S530, the electronic device 110 may collect target data based on data stored in the ring buffer (or memory ring buffer) 121 of the IVI system 120 under a debugging mode. Specifically, the electronic device 110 may execute the adb logcat command supported through the Android Debug Bridge Connect Type menu to transmit a copy of the log message stored in the ring buffer 121 as target data to a server connected to the vehicle. In the case of the Jellybean-based IVI system, the log message stored in the ring buffer 121 may include log messages stored in at least some of the main ring buffer, the system ring buffer, the radio ring buffer, the event ring buffer, the telematics (tms) ring buffer, the audio-video navigation (avn) ring buffer, and the vehicle customer relationship management (vcrm) ring buffer. In the case of the KitKat-based IVI system, the log messages stored in the ring buffer 121 may include log messages stored in at least some of the main ring buffer, the system ring buffer, the radio ring buffer, the event ring buffer, and the mobis ring buffer.

In step S540, the electronic device 110 may enter the log dump menu when the log dump menu is provided in the IVI system 120. Entering the log dump menu may be performed by searching for the Engineering mode or the Dealer mode, selecting the "Log" menu, and clicking the "Log Copy to USB" button, or by selecting the "USB Copy" menu and clicking the "Copy Logs to USB" button.

In step S550, the electronic device 110 may collect target data based on data stored in the disk of the IVI system 120. Specifically, the electronic device 110 may transfer a copy of a log file stored in the storage 123 as target data to a USB drive connected to the vehicle through the log dump menu. In this case, the log file stored in the storage 123 may include at least some of the following: a telematics-related log file, an audio-video navigation-related log file, a vehicle customer relationship management-related log file, a file system (kernel) information-related log file, a mozen service-related log file, a navigation log file (navi log), a network connect-related log file, and a Bluetooth service-related log file. In particular, the electronic device 110 may obtain a system log file and a navigation log file together, to enable effective digital forensics to be performed.

Therefore, the electronic device 110 may collect target data for digital forensics by comprehensively considering vehicle model information and the hardware and software information of the in-vehicle infotainment (IVI) system, thereby achieving the collection of target data having various characteristics. Specifically, the electronic device 110 may collect target data based on data stored in different locations according to the menu provided by the IVI system 120 to collect both volatile data and non-volatile data.

Figure 6:
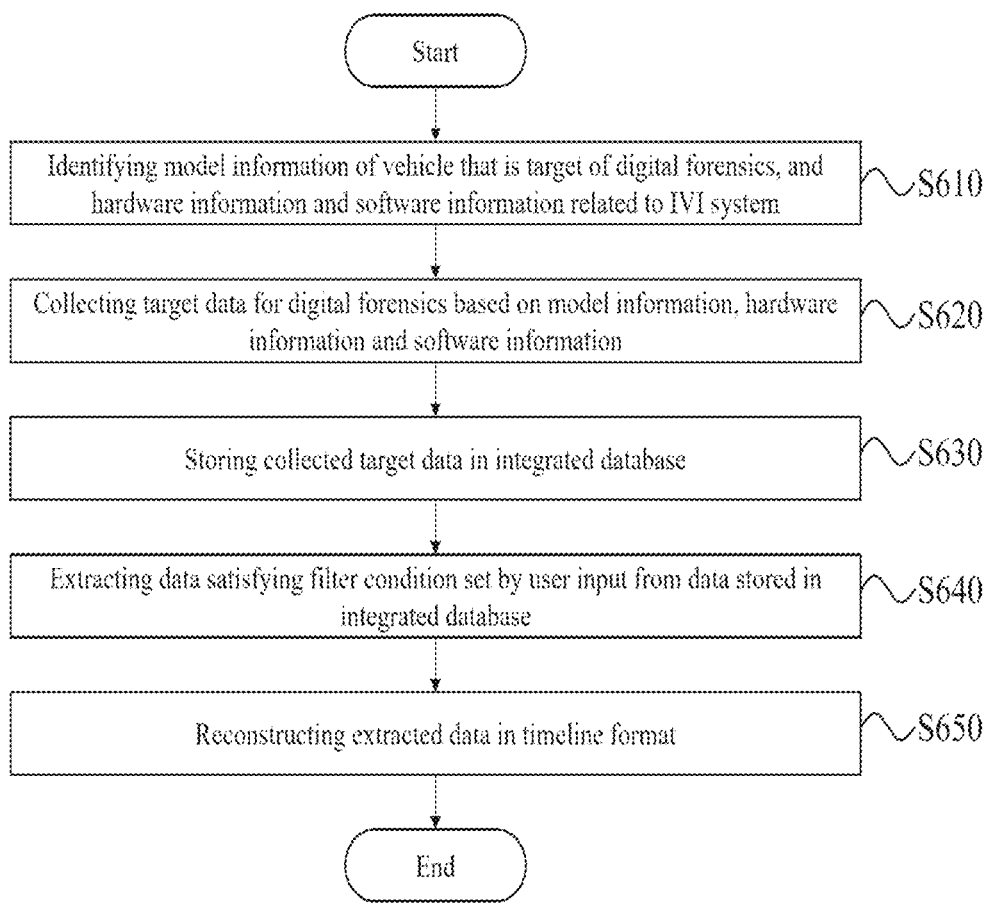
FIG. 6 is a flowchart of a method for collecting, analyzing and integrating log data of an electronic device according to an additional embodiment.

FIG. 6 is a flowchart of a method for collecting, analyzing and integrating log data of an electronic device according to an additional embodiment. For convenience of description, the electronic device 110 is described as an entity of performing the example method, but the entity of performing the method is not limited thereto.

In step S610, the electronic device 110 may identify model information of a vehicle that is the target of digital forensics, and hardware information, and software information related to the IVI system 120 of the vehicle.

In step S620, the electronic device 110 may collect target data for digital forensics based on the identified model information, hardware information, and software information.

Specifically, the electronic device 110 may distinguish between a process of collecting volatile log data and a process of collecting non-volatile log data.

The electronic device 110 may collect volatile log data, which is, for example, memory ring buffer data. Specifically, the electronic device 110 may be connected to the IVI system 120 using a connected device (e.g., a USB cable). In this case, Jellybean may enter an Engineering mode, and KitKat may enter an Engineering mode or Dealer mode. The electronic device 110 may activate ADB in the ADB Connect Type menu and input the adb locat command to collect volatile log data to storage.

In addition, the electronic device 110 may collect non-volatile log data, which is, for example, log file data. Specifically, the electronic device 110 may be connected to the IVI system 120 using a connected device (e.g., a USB cable). In this case, Jellybean may enter an Engineering mode, and KitKat may enter an Engineering mode or Dealer mode. The electronic device 110 may obtain a compressed log file using the "Log Copy to USB" function in the "Log" menu or the "Copy Logs to USB" function in the "USB Copy" menu. Subsequently, the electronic device 110 may decompress the compressed log file to obtain multiple log files.

In step S630, the electronic device 110 may store the collected target data in the integrated database 130.

In step S640, the electronic device 110 may extract data satisfying the filter condition set by a user input from the data stored in the integrated database 130.

In step S650, the electronic device 110 may reconstruct the extracted data in a timeline format. The electronic device 110 may store the collected log data in the integrated database 130 and reconstruct the collected log data in a timeline format at a later user's request to provide the collected log data, thereby providing significant convenience in identifying the circumstances before and after the incident and the causal relationship thereof during the digital forensics process.

Figure 7:
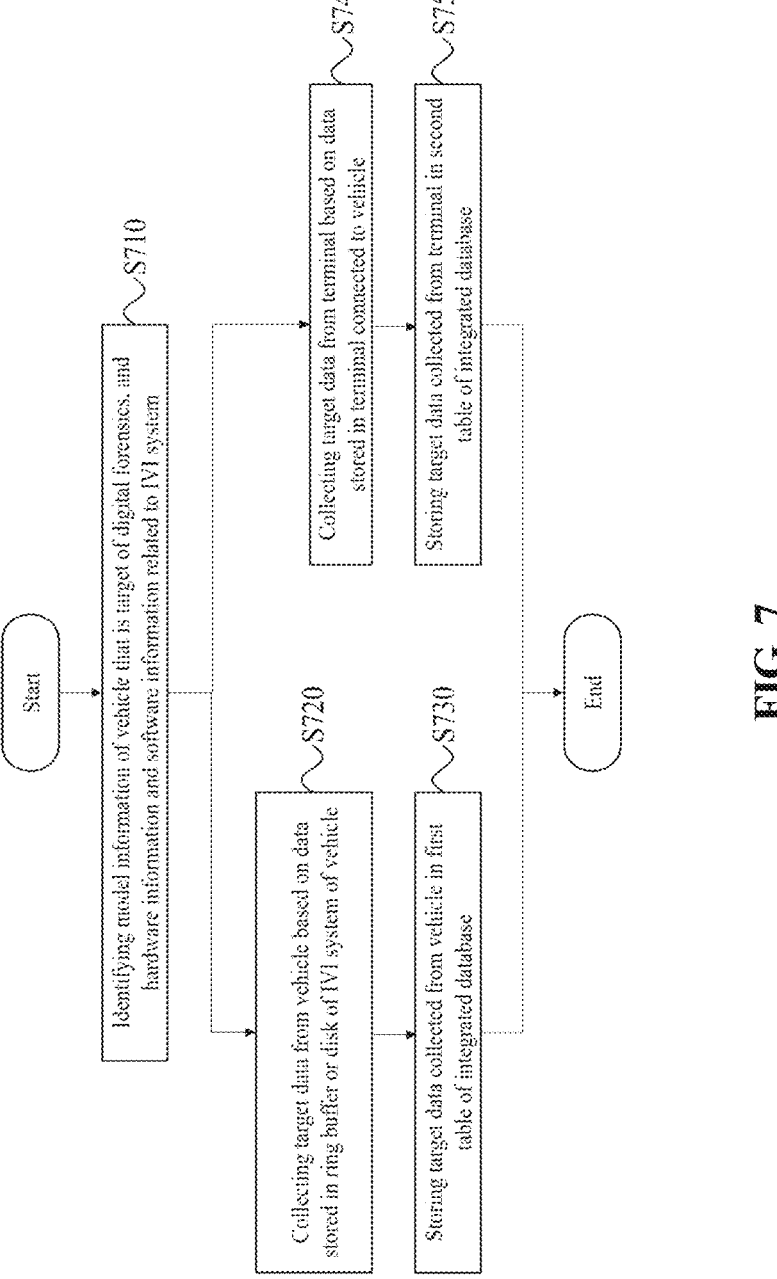
FIG. 7 is a flowchart of a method for collecting, analyzing and integrating log data of an electronic device according to an additional embodiment.

FIG. 7 is a flowchart of a method for collecting, analyzing and integrating log data of an electronic device according to an additional embodiment. For convenience of description, the electronic device 110 is described as an entity of performing the example method, but the entity of performing the method is not limited thereto.

In step S710, the electronic device 110 may identify model information of a vehicle that is the target of digital forensics, and hardware information, and software information related to the IVI system 120 of the vehicle.

In step S720, the electronic device 110 may collect target data from a vehicle based on data stored in a ring buffer or disk of the IVI system 120.

Then, in step S730, the electronic device 110 may store target data collected from the vehicle in a first table in the integrated database 130.

Meanwhile, in step S740, the electronic device 110 may collect target data from a terminal connected to the vehicle based on data stored in the terminal. In this case, the data stored in the terminal may include at least some of app-related data, log files, and network packet data (Bluetooth packet data or Wi-Fi packet data) generated by and stored in the terminal while the terminal is connected to the vehicle. Representative examples of the terminal may include, but are not limited to, a smartphone or tablet operable in connection with the vehicle.

In step S720 or S740, the electronic device 110 may collect the target data. In this case, the collected data may include IVI-related volatile logs (ring buffers) and non-volatile logs (log files or various app data) of the vehicle, and volatile logs and non-volatile data of a mobile terminal connected to the vehicle, such as a driver's smartphone.

The electronic device 110 may collect and filter data from the IVI system 120 or the smartphone separately, and first store the data in a separate database. Next, the electronic device 110 may integrate individual data and store the data in the integrated database.

Accordingly, the collected data may be stored and/or managed in three forms. First, the collected data may be stored and/or managed in its original data form (original data form) as extracted or obtained from a target source device or system. Second, the collected data may be stored in a separate database that stores data obtained through filtering among various data in extracted or obtained files. For example, filtering conditions may be a specific time period (e.g., between May and August 2023), specific events (e.g., navigation, telematics, Bluetooth, or SMS events), or the like. Third, the collected data may be stored in a database in which pieces of individual data are integrated.

In step S750, the electronic device 110 may store the target data collected from the terminal in a second table in the integrated database 130.

Without being limited the steps of FIG. 7, the electronic device 110 may further perform a data analysis (forensic analysis) step. In this case, the data analysis step may include an individual analysis step and an integrated analysis step.

The individual analysis step may be a step of analyzing data included in individual databases. The electronic device 110 may separately analyze the data collected from the IVI system 120, separately analyze data collected from the smartphone connected to the vehicle to build a primary timeline and reconstruct events.

The integrated analysis step may be a step of analyzing data included in the integrated database. The electronic device 110 may integrate and analyze all collected data to build a secondary timeline and reconstruct the events. Through the integrated analysis, the electronic device 110 may observe the analysis results from various angles, and the reliability of the analysis results may be improved through such cross-validation.

In addition, the analysis step may include a process of outputting a response to a question related to a specific event by utilizing an individual database or an integrated database. For example, for questions such as 'Where did the suspect vehicle come from and go to on Jul. 30, 2023?', 'How many passengers were there at that time?', the electronic device 110 may search for and/or analyze data in the database for a corresponding answer in the analysis step. The electronic device 110 may output a response to the question based on the search and/or analysis results. To this end, the database management and question answering process may be implemented through an expert system or an AI-based inference system. Furthermore, filtering may also be applied in the analysis step.

Figure 8:
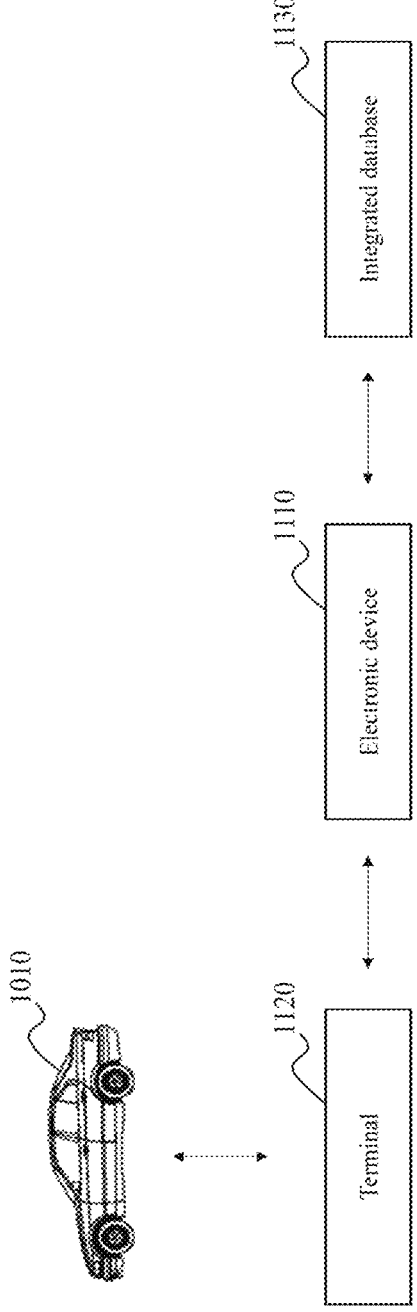
FIG. 8 is a diagram schematically showing a system for collecting and analyzing vehicle diagnostic-related data, including an electronic device according to an embodiment.

FIG. 8 is a diagram schematically illustrating a system for collecting and analyzing vehicle diagnostic-related data, including an electronic device according to an embodiment.

Referring to FIG. 8, the system for collecting, analyzing and integrating log data may include a vehicle 1010, the electronic device 1110, a terminal 1120, and an integrated database 1130.

The electronic device 1110 is a device that performs digital forensics on the vehicle 1010 through the terminal 1120 or performs digital forensics by directly accessing the internal system of the vehicle 1010, and may collect various data related to vehicle diagnostics in the digital forensics process and analyze the data to generate various forensic artifacts that may be used as results of digital forensics.

The terminal 1120 is a device capable of operating while being connected to a scanner attached to an OBD (On-Board Diagnostics)-2 terminal of the vehicle, and is assumed to have a vehicle diagnostic application installed. In particular, the OBD-2 scanner of the vehicle and terminal 1120 may be connected via Bluetooth, and the terminal 1120 may be a device operating on an Android-based operating system. OBD-2 is a vehicle diagnostic system that generates an error code when a trouble occurs in an in-vehicle system and monitors the in-vehicle system, and the OBD-2 connector is used to access an in-vehicle diagnostic system and is defined according to the SAE 1962 standard. In addition, the OBD-2 scanner refers to a port that enables connection to an ECU (Electronic Control Unit) that collects data from various sensors throughout the vehicle.

Meanwhile, the electronic device 1110 may exchange information with the terminal 1120 and the integrated database 1130 via a network electronically connected therebetween. The network may be a comprehensive data communication network that includes a local area network (LAN), a wide area network (WAN), a value added network (VAN), a mobile radio communication network, a satellite communication network, a content delivery network (CDN), and any combination thereof and enables smooth communication between network components depicted in FIG. 8, and may include wired internet, wireless internet, and mobile wireless communication networks. The wireless communication may be, for example, but not limited to, wireless LAN (Wi-Fi), Bluetooth, Bluetooth low energy, Zigbee, Wi-Fi Direct (WFD), ultra wideband (UWB), infrared data association (IrDA), near field communication (NFC), and the like.

The system illustrated in FIG. 8 shows only components relevant to the present embodiment. Accordingly, it will be understood by one of ordinary skill in the art that other general purpose components may be included in addition to those shown in FIG. 8.

Figure 9:
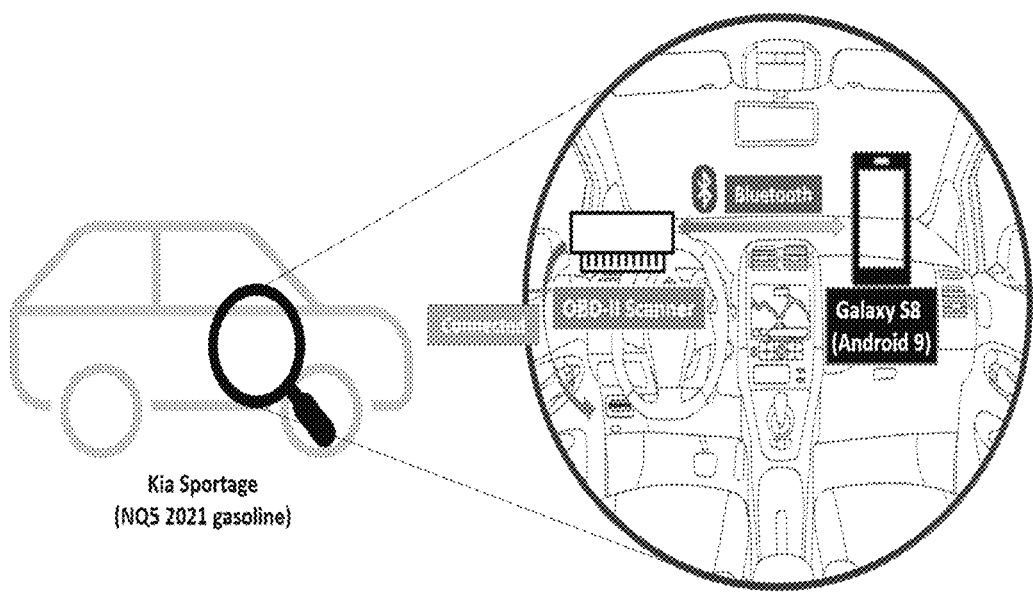
FIG. 9 is a diagram illustratively showing the interior of a vehicle while being connected to a terminal (e.g., smartphone)

FIG. 9 is a diagram illustratively showing the interior of a vehicle while being connected to a terminal.

Specifically, FIG. 9 shows the entire configuration of the internal system of the vehicle 1010 that is actually driving. The model of the vehicle 1010, the model of the terminal 1120, the communication connection method between the vehicle 1010 and the terminal 1120, or the like may vary depending on the embodiment, but in FIG. 9, for convenience of description, the model of the vehicle 1010 is "Sportage NQ5", the model of the terminal 1120 is "Galaxy S8", and the communication connection method between the vehicle 1010 and the terminal 1120 is exemplified as the OBD-2 scanner of the terminal 1120 and the vehicle 1010 being connected via Bluetooth.

Figure 10:
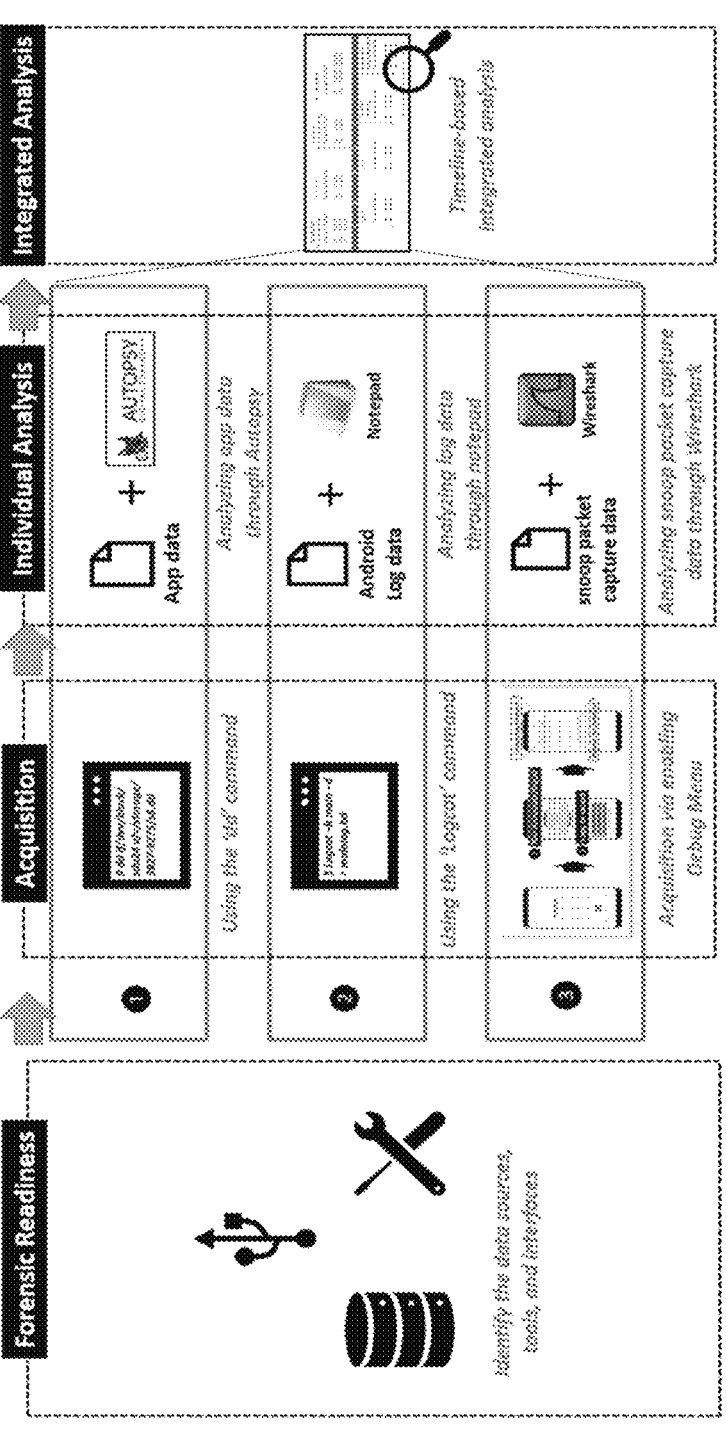
FIG. 10 is a diagram showing a digital forensics process for a vehicle diagnosis app and logs, which is proposed by the present disclosure.

FIG. 10 is a diagram showing a digital forensics process proposed in the present disclosure, including the flow of vehicle diagnosis-related data between the terminal and the electronic device.

The digital forensics process of the present disclosure may include a forensic readiness step, an acquisition step of collecting data from each data source, an individual analysis step of individually analyzing the collected data by data source, and an integrated analysis step of integrating all three data sources and performing analysis.

In this specification, the electronic device 1110 may collect and analyze vehicle diagnosis-related data from the terminal 1120 through the forensic readiness step, the acquisition step, the individual analysis step, and the integrated analysis step. The forensic readiness step may have the same meaning as a forensic identification step.

[Forensic readiness step=forensic identification step]

The electronic device 1110 may evaluate whether the digital forensics of the vehicle 1010 through the terminal 1120 is cost-effective. To this end, the electronic device 1110 may first identify a storage location related to event generation, which is a potential data source. The potential data source may refer to the location of data stored when driving is performed based on a scenario using a vehicle diagnostic app. The storage locations related to event generation may include an app data storage where vehicle diagnostic app data is stored, a memory ring buffer (or memory ring buffer or memory circular buffer or simply ring buffer) in which Android log messages are stored, and a Bluetooth packet transmitted and received between the terminal 1120 and the scanner which are in Bluetooth communication. Secondly, the electronic device 1110 may determine an interface used for forensics. For example, app data, log messages, and Bluetooth packets may be obtained by utilizing the ADB and USB interface. Thirdly, the electronic device 1110 may identify and determine tools available for data collection (e.g., dd, dcfldd, dc3dd, logcat command functions) and tools available for data analysis (e.g., autopsy, notepad, wireshark).

Meanwhile, the acquisition step and the individual analysis step for data will be described later with reference to FIGS. 11 to 13 below, and the integrated analysis step for data will be described in detail later with reference to FIG. 14 below.

Figure 11:
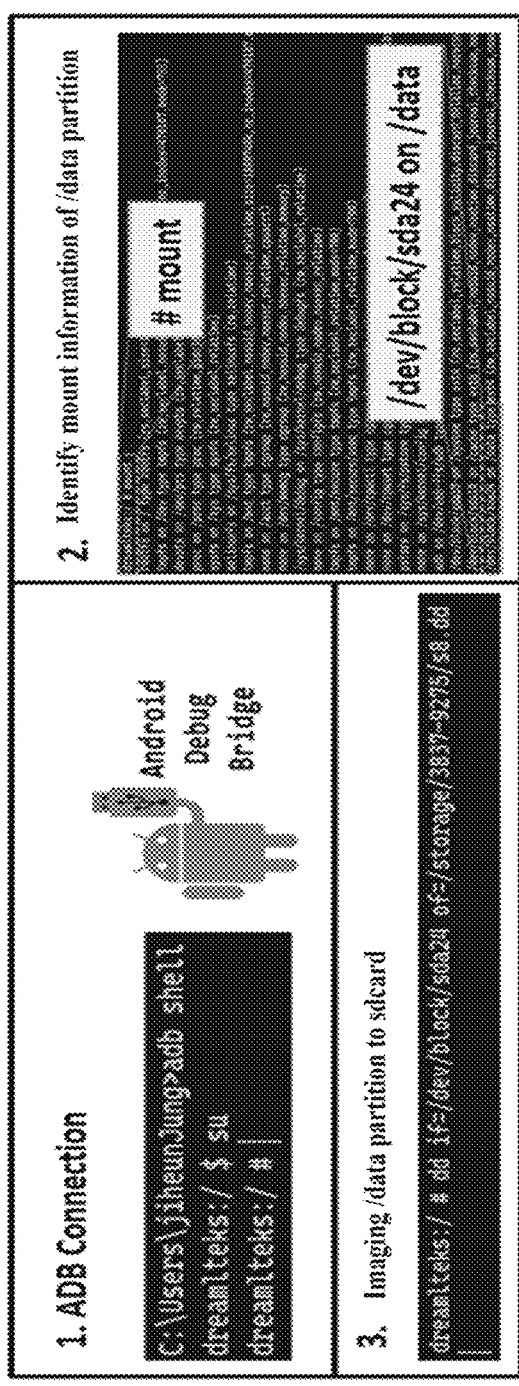
FIG. 11 is a diagram showing a step of collecting first data (e.g., vehicle diagnosis app data, Type 1 data) according to an embodiment.

FIG. 11 is a diagram showing a step of collecting first data according to an embodiment.

The first data related to the vehicle diagnostic app may include data stored for use in the vehicle diagnostic app and may be stored in the user data area of the terminal 1120. In order to obtain the first data stored in the user data area, the electronic device 1110 may require permission to access a file, and for this purpose, rooting may be required. In this specification, it is assumed that the terminal 1120 is rooted.

Referring to FIG. 11, in order to obtain the first data, the electronic device 1110 may first enter the developer options of the terminal 1120, allow USB debugging, and then execute the shell command of the Android Debug Bridge (ADB) tool through a USB (Universal Serial Bus) connection between the terminal 1120 and the electronic device 1110. Subsequently, the electronic device 1110 may change to a root user using the 'su' command, identify the mount information of "/data" using the 'mount' command, and store the first data in a storage medium (e.g., an external SD card) inserted into the electronic device 1110 using the 'dd' command.

Thereafter, the electronic device 1110 may analyze the collected first data (e.g., an image file of the "/data" partition) using the forensic tool, "autopsy". In the first data, major artifacts for digital forensics may be stored in the form of an xml file. Examples of such major artifacts may include the total run distance, average fuel efficiency, driving start time, driving end time, driving time, latitude of the driving start point, longitude of the driving start point, latitude of the driving end point, longitude of the driving end point, real-time latitude, real-time longitude, user information registered in the vehicle diagnosis application, diagnosis start time, fault code, diagnosis code, sudden acceleration time, sudden acceleration count, sudden deceleration time, and sudden deceleration count of the vehicle 1010.

Figure 12:
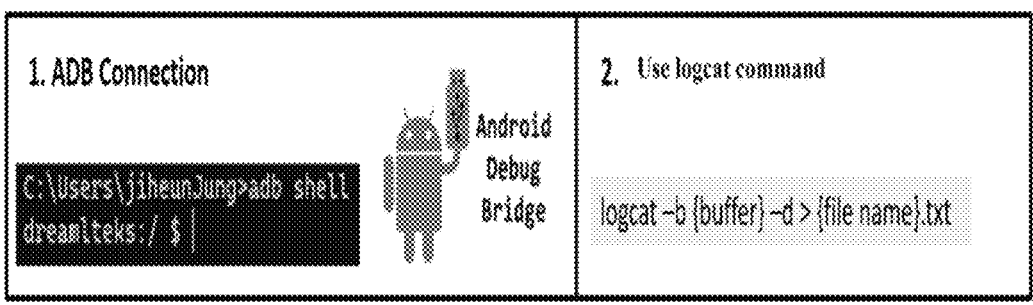
FIG. 12 is a diagram showing a step of collecting second data (e.g., Android log data, Type 2 data) according to an embodiment.

FIG. 12 is a diagram showing a step of collecting second data according to an embodiment.

Log data of an Android-based device is stored in a memory ring buffer in the kernel area. Basically, there are four buffers in the memory ring buffer: main, radio, events, and system, and a buffer may be added or removed depending on the manufacturer or model of the device. The memory ring buffer is a circular buffer that overwrites older messages when it is full, and data extraction from the memory ring buffer may be performed using the logcat tool. Logcat may only be executed inside an Android-based device, and may be typically executed using the Android Debug Bridge interface.

In order to collect the second data stored in the memory ring buffer of the terminal, the electronic device 1110 may execute the shell command of the ADB tool in the same manner as the first data collection, and store data in the main, events, system, and radio buffers in a text file format using the logcat command in the path '/sdcard'. Meanwhile, since the abnormal termination log stored in the crash buffer may be unrelated to the driving scenario of the vehicle 1010, the abnormal termination log may be collected selectively.

The electronic device 1110 may analyze the collected text file through the notepad program. The electronic device 1110 may identify the source of the log message corresponding to the second data and a class or activity where a log call occurs, based on a tag name. Examples of the second forensic artifact, which is generated as the result of analysis, may include the MAC address information of the terminal 1120, a log message according to the communication connection between the terminal 1120 and the vehicle 1010, and a log message according to the communication disconnection between the terminal 1120 and the vehicle 1010, or the like.

Figure 13:
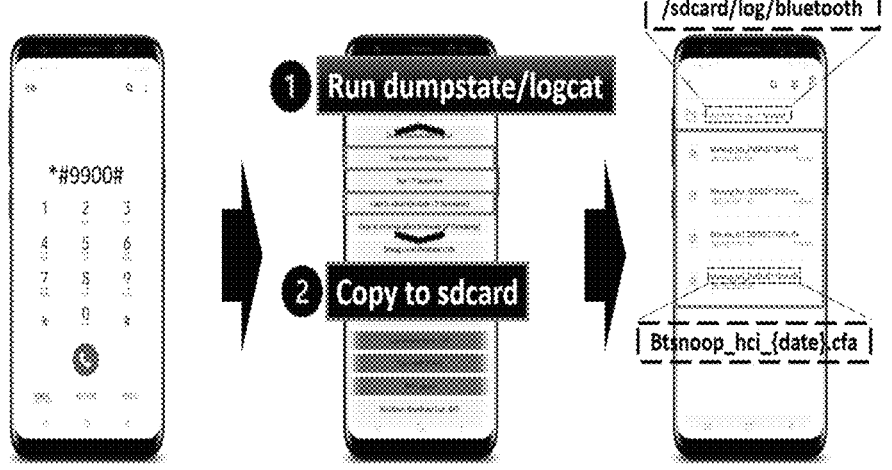
FIG. 13 is a diagram showing a step of collecting third data (e.g., Bluetooth HCI snoop log data, Type 3 data) according to an embodiment.

FIG. 13 is a diagram showing a step of collecting third data according to an embodiment.

The Bluetooth HCI Snoop logging is a function for debugging the Bluetooth stack of a device, and may log all Bluetooth packet data including personal information. The Bluetooth HCI Snoop log data may be stored in "data/misc/bluetooth/logs" in most Android-based devices, but may be stored in "data/log/bt" in some other devices. Hereinafter, it is assumed that the third data is data related to communication packets recorded in an environment where the terminal 1120 and the vehicle 1010 are connected via Bluetooth wireless communication.

In order to collect the third data related to communication packets in the Bluetooth wireless communication environment, it is necessary to activate a relevant function through a developer option before driving. Therefore, the electronic device 1110 may enter the sysdump menu of the terminal 1120 through a dial input (e.g., "* #9900 #") to the terminal 1120. Thereafter, the electronic device 1110 may allow the third data to be stored in "/data/log", which is the internal storage of the terminal 1120, using the "Run dumpstate/logcat" function, and since the internal storage of the terminal 1120 is unable to be accessed with general user authority, the electronic device 1110 may copy the third data to "/sdcard/log/bluetooth", which is the external storage of the terminal 1120, using the "copy to sdcard" function. That is, the electronic device 1110 may move and store the third data stored in the terminal 1120 to a storage medium (e.g., an SD card) inserted into the electronic device 1110.

The electronic device 1110 may analyze the collected third data through the wireshark, which is a network packet tool. Specifically, the electronic device 1110 may identify which event each third data is packet data related to, based on the pattern of the third data having the format of a communication packet, and generate a third forensic artifact based on a result of the identification. Examples of the third forensic artifact may include event information about at least some of the following: communication connection between the terminal 1120 and the vehicle 1010, communication disconnection, driving start of the vehicle 1010, sudden acceleration, sudden deceleration, idling, vehicle diagnosis, and vehicle refueling.

Figure 14:
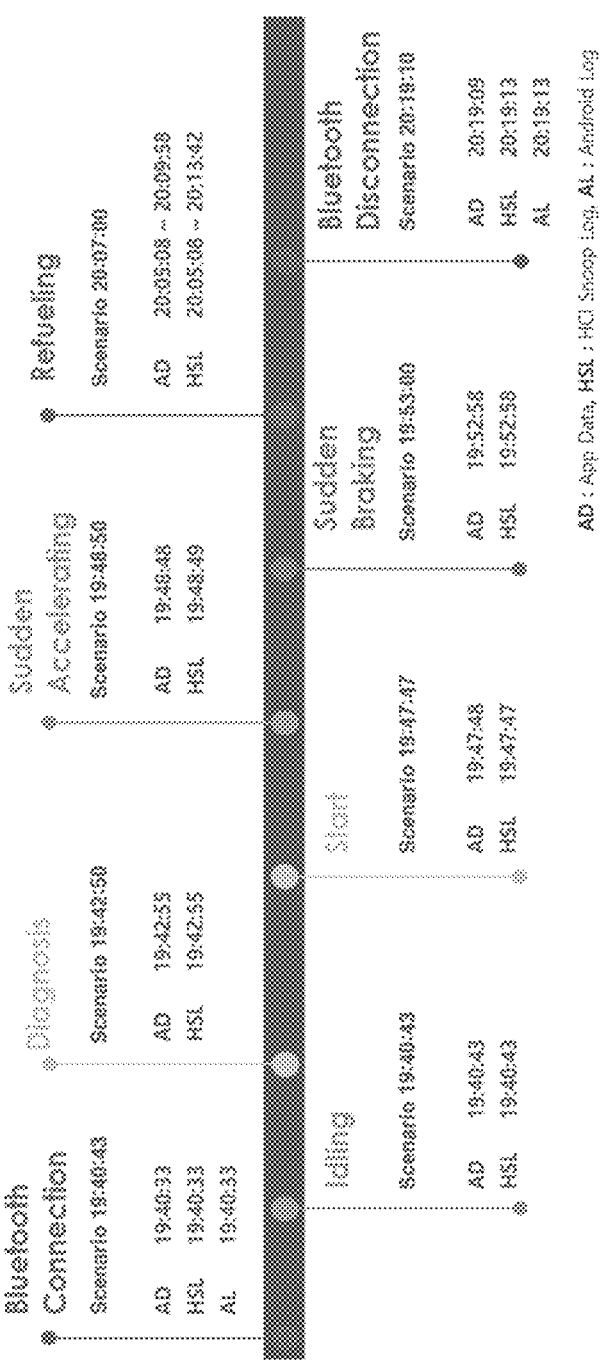
FIG. 14 is a diagram showing data reconstructed in a timeline format by integrating various data types (first data, second data, and third data) related to vehicle diagnosis according to one embodiment.

FIG. 14 is a diagram showing data reconstructed in a timeline format according to an embodiment. The visual arrangement, format, or the like of the reconstructed data may differ from the contents illustrated in FIG. 14 depending on the type of a vehicle diagnosis app used.

Referring to FIG. 14, the time point or time period of occurrence of each event may be estimated through the first data AD, the second data AL, and the third data HSL. Under the timeline format, events may be arranged horizontally (or vertically) from one direction to the opposite, in chronological order of their estimated event occurrence time points (or time periods). The types of events displayed may vary depending on the initial settings of the electronic device 1110 or the user's settings input for the electronic device 1110, and in the example illustrated in FIG. 14, events related to Bluetooth connection, idling, vehicle diagnosis, vehicle departure, sudden acceleration, sudden deceleration, vehicle refueling, and Bluetooth disconnection are displayed.

The electronic device 1110 may store the collected data in the integrated database 1130, and reconstruct and provides the collected data in a timeline format at a later user's request, thereby providing considerable convenience in identifying the circumstances before and after the incident and the causal relationship during the digital forensics process.

FIG. 15 is a flowchart of a method of collecting and analyzing vehicle diagnostics-related data of an electronic device according to an embodiment. For convenience of description, the electronic device 1110 is described as an entity of performing the example method, but the entity of performing the method is not limited thereto.

In step S810, the electronic device 1110 may identify whether the terminal 1120 that is the target of digital forensics is in communication with the vehicle 1010.

In step S820, the electronic device 1110 may collect first data related to a vehicle diagnostic application installed in the terminal 1120 to operate in cooperation with the onboard system (e.g., OBD-II) of the vehicle 1010.

In step S830, the electronic device 1110 may access a logging system of the terminal 1120 and collect second data stored in a memory ring buffer.

In step S840, the electronic device 1110 may collect third data related to communication packets between the terminal 1120 and the vehicle 1010.

In step S850, the electronic device 1110 may analyze the first data using a forensic tool such as autopsy to identify a first forensic artifact.

According to an embodiment, the first forensic artifact may include event information for at least some of a total driving distance, average fuel efficiency, driving start time, driving end time, driving time, latitude of the driving start point, longitude of the driving start point, latitude of the driving end point, longitude of the driving end point, real-time latitude, real-time longitude, user information registered in the vehicle diagnosis application, diagnosis start time, fault code, diagnosis code, sudden acceleration time, sudden acceleration count, sudden deceleration time, and sudden deceleration count of the vehicle 1010.

In step S860, the electronic device 1110 may analyze the second data using a tool such as notepad to identify a second forensic artifact.

According to an embodiment, the second forensic artifact may include at least some of the MAC address information of the terminal 1120, a log message according to the communication connection between the terminal 1120 and the vehicle 1010, and a log message according to the communication disconnection between the terminal 1120 and the vehicle 1010.

In step S870, the electronic device 1110 may analyze the third data using a network packet tool to identify a third forensic artifact.

According to an embodiment, the third forensic artifact may include event information about at least some of the communication connection between the terminal 1120 and the vehicle 1010, the communication disconnection, the driving start, sudden acceleration, sudden deceleration, idling, vehicle diagnosis, and vehicle refueling of the vehicle 1010.

Meanwhile, according to an embodiment, the electronic device 1110 may store the first forensic artifact, the second forensic artifact, and the third forensic artifact, which are identified, in the integrated database 1130. Furthermore, the electronic device 1110 may extract data that satisfies a filter condition set by a user input from data stored in the integrated database 1130 and reconstruct the extracted data in a timeline format.

As described above, the first to third forensic artifacts identified by analyzing the collected first to third data may serve as a basis for utilizing the actions of the driver of the vehicle 1010 and various events that occurred while the driver was operating the vehicle 1010 as digital evidence. In addition, not only the first to third forensic artifacts identified by individual analysis, but also the reconstructed data in a timeline format obtained by comprehensively analyzing the first to third data may be used as a very important source for investigations related to traffic, vehicle insurance, or crime.

Figure 16:
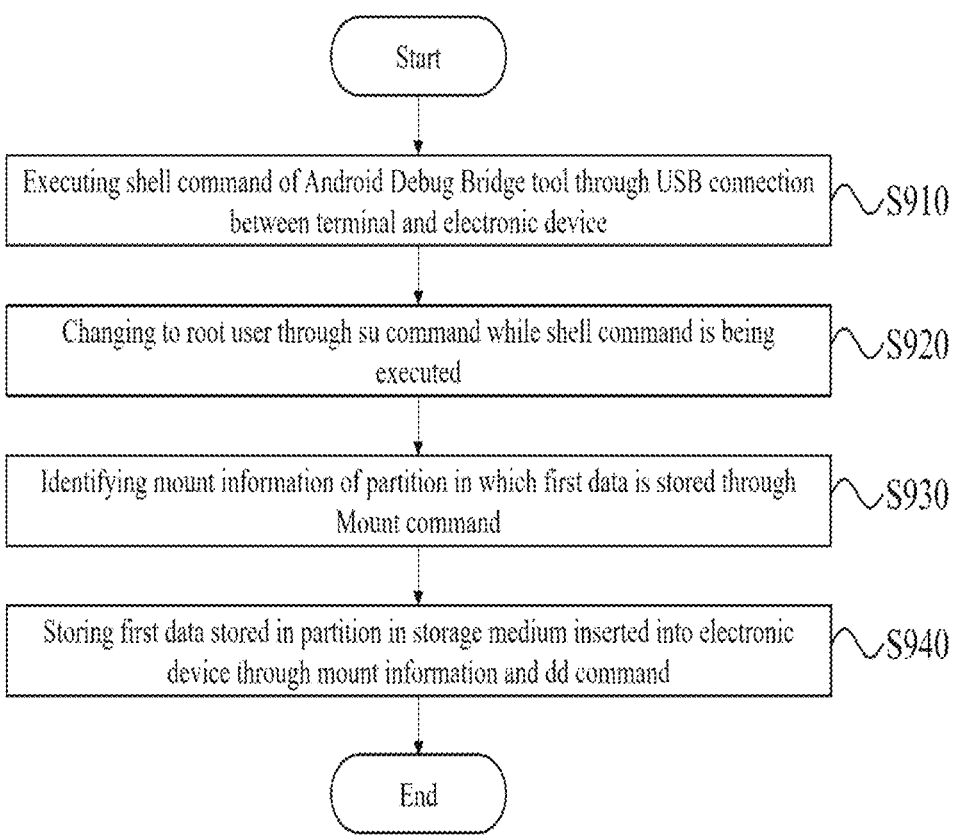
FIG. 16 is a flowchart for specifically describing a step of collecting first data.

FIG. 16 is a flowchart for specifically describing a step of collecting first data. For convenience of description, the electronic device 1110 is described as an entity of performing the example method, but the entity of performing the method is not limited thereto.

In step S910, the electronic device 1110 may execute a shell command of the Android Debug Bridge tool through the USB (Universal Serial Bus) connection between the terminal 1120 and the electronic device 1110.

In step S920, the electronic device 1110 may change to a root user through the su command while the shell command is being executed.

In step S930, the electronic device 1110 may identify the mount information of a partition where the first data is stored through the Mount command.

In step S940, the electronic device 1110 may store the first data, which is stored in the partition, in a storage medium inserted into the electronic device 1110, through the mount information and the dd command.

Figure 17:
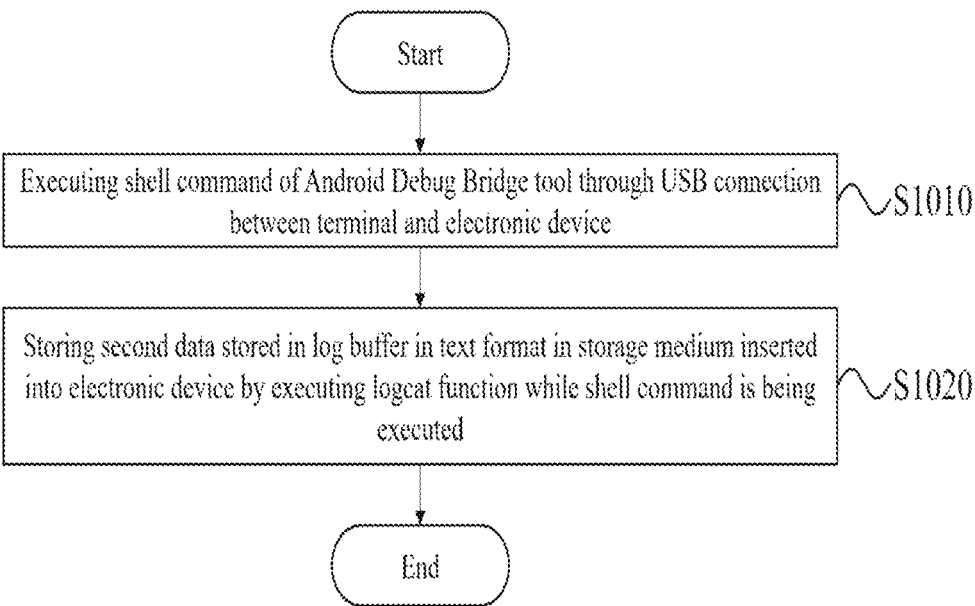
FIG. 17 is a flowchart for specifically describing a step of collecting second data.

FIG. 17 is a flowchart for specifically describing a step of collecting second data. For convenience of description, the electronic device 1110 is described as an entity of performing the example method, but the entity of performing the method is not limited thereto.

In step S1010, the electronic device 1110 may execute a shell command of the Android Debug Bridge tool through the USB connection between the terminal 1120 and the electronic device 1110.

In step S1020, the electronic device 1110 may execute the logcat function while the shell command is being executed to store the second data stored in the memory ring buffer as a text file in a storage medium inserted in the electronic device 1110.

Figure 18:
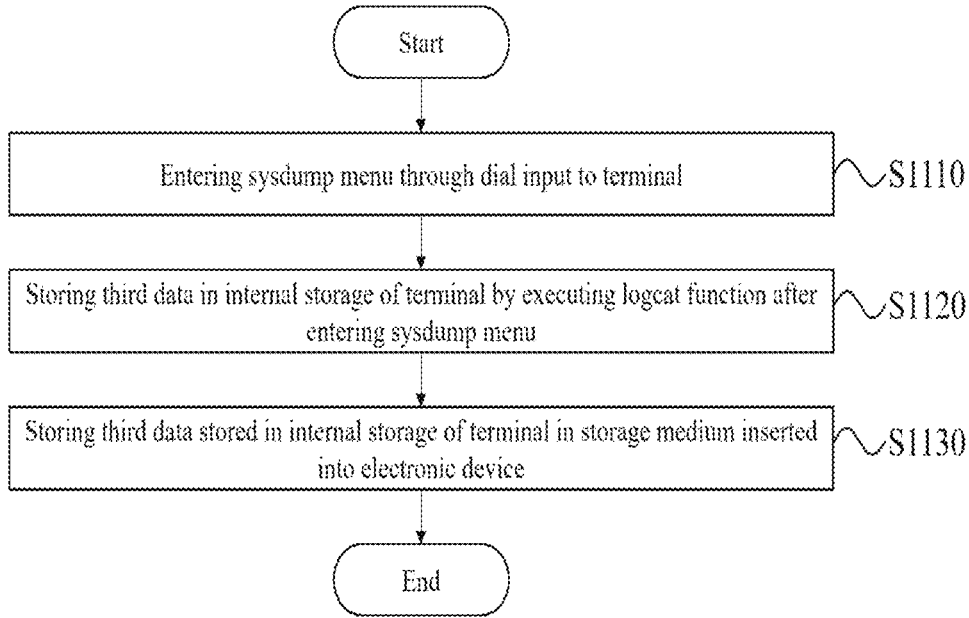
FIG. 18 is a flowchart for specifically describing a step of collecting third data.

FIG. 18 is a flowchart for specifically describing a step of collecting third data. For convenience of description, the electronic device 1110 is described as an entity of performing the example method, but the entity of performing the method is not limited thereto.

In step S1110, the electronic device 1110 may enter the sysdump menu via a dial input to the terminal 1120.

In step S1120, after entering the sysdump menu, the electronic device 1110 may execute the logcat function to store the third data in the internal storage of the terminal 1120.

In step S1130, the electronic device 1110 may store the third data stored in the internal storage of the terminal 1120 on a storage medium inserted into the electronic device 1110.

Figure 19:
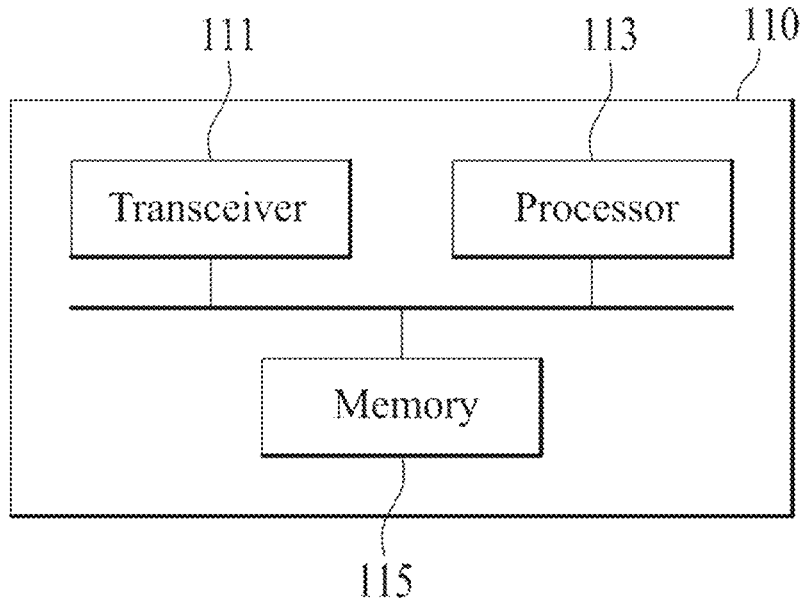
FIG. 19 is a block diagram of an electronic device according to an embodiment.

FIG. 19 illustrates a block diagram of an electronic device, according to an embodiment.

The electronic device 110 may include a transceiver 111, a processor 113, and a memory 115, according to an embodiment. The electronic device 110 may be connected to the IVI system 120 and the integrated database 130 via the transceiver 111 to exchange data with the IVI system 120 and the integrated database 130.

The processor 113 may perform at least one of the methods described above with reference to FIGS. 4 to 7. The memory 115 may store information for performing at least one of the methods described above through FIGS. 4 to 7. The memory 115 may be a volatile memory or a non-volatile memory.

The processor 113 may perform at least one of the methods described above with reference to FIGS. 15 to 18. The memory 115 may store information for performing at least one of the methods described above with reference to FIGS. 15 to 18. The memory 115 may be a volatile memory or a non-volatile memory.

The processor 113 may control the electronic device 110 to execute programs and provide information. The codes of a program executed by the processor 113 may be stored in the memory 115.

The processor 113 may be connected to the transceiver 111 and the memory 115 to identify model information of a vehicle that is the target of digital forensics, hardware information and software information associated with the IVI system 120 of the vehicle, collect target data for digital forensics based on the model information, the hardware information, and the software information, and store the collected target data in the integrated database 130. The electronic device 110, according to an embodiment, may further include an interface to provide information to a user.

The processor 113 may be connected to the transceiver 111 and memory 115 to identify that the terminal 1120 that is the target of digital forensics is in communication with the vehicle, collect first data related to a vehicle diagnostic application installed on the terminal 1120, which operates in cooperation with the on-board system of the vehicle, analyze the first data via the autopsy tool to identify a first forensic artifact, access a logging system of the terminal 1120 which operates in cooperation with the on-board system of the vehicle, to collect second data stored in a memory ring buffer (or log buffer, or ring buffer), analyze the second data via the notepad tool to identify a second forensic artifact, collect third data related to communication packets between the terminal 1120 and the vehicle, and analyze the third data via a network packet tool to identify a third forensic artifact. The electronic device 110 according to an embodiment may further include an interface capable of providing information to a user.

The electronic device 110 illustrated in FIG. 8 shows only components relevant to the present embodiment. Accordingly, it will be understood by one of ordinary skill in the art that other general purpose components may be included in addition to those shown in FIG. 8. Without being limited to FIG. 8, the electronic device 110 may include a wired or wireless communication device.

The device according to the embodiments as described above may include a processor, a memory for storing and executing program data, a permanent storage such as a disk drive, a communication port for communicating with an external device, a user interface device such as a touch panel, a key, or a button, and the like. The methods embodied as a software module or an algorithm may be stored as computer readable codes or program commands that are executable on the processor in a computer readable recording medium. The computer readable recording medium is any non-volatile data storage device that ay store data which may be thereafter read by a computer system. Examples of the computer readable recording medium include magnetic storage mediums (e.g., hard disks, etc.) and optical reading mediums including CD-ROMs, DVDs, etc. The computer-readable recording medium may also be distributed over network-coupled computer systems so that the computer-readable code is stored and executed in a distributed fashion.

The mediums may be read by computers, may be stored in the memory, and may be executed on the processor.

The present embodiments may be represented with functional blocks and various processing steps. These functional blocks may be implemented by various numbers of hardware and/or software configurations for executing specific functions. For example, the embodiments may adopt direct circuit configurations, such as memory, processing, logic, and look-up table, for executing various functions under control of one or more microprocessors or by other control devices. Like components being able to execute the various functions with software programming or software elements, the present embodiments may be implemented by a programming or scripting language, such as C, C++, Java, or assembler, with various algorithms implemented by a combination of a data structure, processes, routines, and/or other programming components. Functional aspects may be implemented with algorithms executed in one or more processors. In addition, the present embodiments may adopt the prior art for electronic environment setup, signal processing and/or data processing. The terms, such as "mechanism", "element", "means", and "configuration", may be widely used and are not delimited as mechanical and physical configurations. The terms may include the meaning of a series of routines of software in association with a processor or the like.

The above-described embodiments are only examples, and other embodiments may be implemented within the scope of the claims set forth herein.

According to the embodiments disclosed herein, it is possible to collect target data for digital forensics by comprehensively considering vehicle model information and the hardware and software information of an in-vehicle infotainment (IVI) system, thereby achieving the collection of target data having various characteristics. Specifically, it is possible to collect target data based on data stored in different locations according to the menu provided by the IVI system to collect both volatile data and non-volatile data.

Further, according to the embodiments disclosed herein, it is possible to store the collected log data in the integrated database and reconstruct the collected log data in a timeline format at a later user's or investigator's request to provide the collected log data, thereby providing significant convenience in identifying the circumstances before and after the incident and the causal relationship thereof during the digital forensics process.

Further, according to the embodiments disclosed herein, it is possible to collect various types of data that may be used for vehicle diagnosis through collection functions appropriate for each type of data and analyze the data through forensic tools appropriate for each type of data, thereby effectively identifying various artifacts necessary for comprehensively analyzing incidents that occurred during vehicle operation, in an environment where vehicles and terminals area able to communicate electronically.

Further, according to the embodiments disclosed herein, it is possible to store the collected various data in the integrated database and reconstruct and provide the collected data in a timeline format at a later user's request to provide the collected log data, thereby providing significant convenience in identifying the circumstances before and after the incident and the causal relationship thereof during the digital forensics process.

However, effects of the inventive concept may not be limited to the above-described effects. Although not described herein, other effects of the inventive concept may be clearly understood by those skilled in the art from the claims.

What is claimed is:

1. A method for collecting, analyzing and integrating log data of an in-vehicle infotainment (IVI) system, the method being performed by an electronic device, the method comprising:

identifying model information of a vehicle to be a target of digital forensics, hardware information and software information related to the IVI system of the vehicle;

collecting target data for the digital forensics based on the model information, the hardware information and the software information; and storing the collected target data in an integrated database, wherein the collecting of the target data includes:

operating the IVI system in an Engineering mode or a Dealer mode based on the model information, the hardware information, and the software information;

collecting the target data capable of being collected according to a type of menu provided by the IVI system;

entering an Android Debug Bridge Connect Type (ADB Connect Type) menu and switching the IVI system to a debugging mode when the Android Debug Bridge Connect Type menu is provided in the IVI system; and collecting the target data based on data stored in ring buffers of the IVI system or collecting the target data rooting the IVI system, under the debugging mode.

2. The method of claim 1, wherein the IVI system is an IVI system based on an Android, Gingerbread, Jellybean, KitKat or Automotive operating system.

3. The method of claim 1, wherein the hardware information includes location information of a USB (Universal Serial Bus) port interface of the IVI system.

4. The method of claim 1, wherein the software information includes at least a portion of version information of an operating system on which the IVI system operates, software version information of the IVI system, kernel version information of the IVI system, and a build number of the IVI system.

5. The method of claim 1, wherein the collecting of the target data includes executing an adb logcat command supported through the Android Debug Bridge connect type menu to transmit a copy of log messages stored in the ring buffers to a server connected to the vehicle as the target data.

6. The method of claim 5, wherein the log messages stored in the ring buffer includes log messages stored in at least some of a main ring buffer, a system ring buffer, a radio ring buffer, an event ring buffer, a telematics (tms) ring buffer, an audio-video navigation (avn) ring buffer, a vehicle customer relationship management (vcrm) ring buffer, and a mobis ring buffer.

7. The method of claim 1, wherein the collecting of the target data includes:

entering a Log Dump menu when the Log Dump menu is provided in the IVI system; and collecting the target data based on data stored in a disk of the IVI system.

8. The method of claim 7, wherein the collecting of the target data includes transmitting a copy of log files stored in the disk to a USB drive connected to the vehicle as the target data through the Log Dump menu.

9. The method of claim 8, wherein the log files stored in the disk includes at least some of a telematics-related log file, an audio-video navigation-related log file, a vehicle customer relationship management-related log file, a file system (kernel) information-related log file, a mozen service-related log file, a network connect-related log file, and a Bluetooth service-related log file.

10. The method of claim 1, further comprising:
extracting data that satisfies a filter condition set by a user input from data stored in the integrated database; and
reconstructing the extracted data in a timeline format.

11. The method of claim 1, wherein the collecting of the target data includes:
collecting the target data from the vehicle based on data stored in ring buffers or a disk of the IVI system; and
collecting the target data from a terminal connected to the vehicle based on data stored in the terminal.

12. The method of claim 11, wherein the data stored in the terminal includes at least a portion of app-related data, a log file, and a packet data generated and stored in the terminal, while the terminal is being connected to the vehicle.

13. The method of claim 11, wherein the storing of the collected target data includes
storing the target data collected from the vehicle in first table within the integrated database; and
storing the target data collected from the terminal in a second table within the integrated database.

14. A non-transitory computer-readable recording medium having recorded thereon a program for executing the method of claim 1 on a computer.

15. An electronic device for collecting, analyzing and integrating log data of an in-vehicle infotainment (IVI) system, comprising:
a memory configured to store instructions; and
a processor,
wherein the processor is configured to, while being connected to the memory,
identify model information of a vehicle to be a subject of digital forensics, hardware information and software information related to the IVI system of the vehicle;
collect target data for the digital forensics based on the model information, the hardware information and the software information; and
store the collected target data in an integrated database,
wherein the target data is collected by operating the IVI system in an Engineering mode or a Dealer mode based on the model information, the hardware information, and the software information, and according to a type of menu provided by the IVI system, or
wherein the target data is collected by entering an Android Debug Bridge Connect Type (ADB Connect Type) menu and switching the IVI system to a debugging mode when the Android Debug Bridge Connect Type menu is provided in the IVI system and based on data stored in ring buffers of the IVI system or by rooting the IVI system, under the debugging mode.

* * * * *